(12) United States Patent
Zhao et al.

(10) Patent No.: US 7,461,369 B2
(45) Date of Patent: Dec. 2, 2008

(54) JAVA APPLICATION RESPONSE TIME ANALYZER

(75) Inventors: Ling Z. Zhao, Cypress, TX (US); Troy L. Cline, Leander, TX (US); Rick G. Braddy, Coral Springs, FL (US)

(73) Assignee: BMC Software, Inc., Houston, TX (US)

( * ) Notice: Subject to any disclaimer, the term of this patent is extended or adjusted under 35 U.S.C. 154(b) by 398 days.

(21) Appl. No.: 10/113,870

(22) Filed: Mar. 29, 2002

(65) Prior Publication Data

US 2002/0174421 A1    Nov. 21, 2002

Related U.S. Application Data

(60) Provisional application No. 60/280,170, filed on Mar. 30, 2001.

(51) Int. Cl.
*G06F 9/44* (2006.01)
(52) U.S. Cl. ..................................................... 717/131
(58) Field of Classification Search ................. 717/118, 717/171–173, 176–178, 130–131; 709/224, 709/25
See application file for complete search history.

(56) References Cited

U.S. PATENT DOCUMENTS

| | | | |
|---|---|---|---|
| 5,732,218 A * | 3/1998 | Bland et al. ................... | 709/224 |
| 5,781,449 A * | 7/1998 | Rosborough ................. | 709/224 |
| 5,958,010 A | 9/1999 | Agarwal et al. | |
| 5,974,237 A | 10/1999 | Shurmer et al. | |
| 6,002,871 A | 12/1999 | Duggan et al. ............... | 395/704 |
| 6,003,079 A | 12/1999 | Friedrich et al. | |
| 6,006,260 A * | 12/1999 | Barrick et al. ............... | 709/224 |
| 6,021,439 A * | 2/2000 | Turek et al. .................. | 709/224 |

(Continued)

FOREIGN PATENT DOCUMENTS

EP    0 404 505 A2    12/1990

(Continued)

OTHER PUBLICATIONS

Cooper, Michael D; "Design Considerations in Instrumenting and Monitoring Web-Based Information Retrieval Systems", 1998, Journal of the American Society for Information Science, retrieved from scholar.google.com search Sep. 27, 2007.*

(Continued)

*Primary Examiner*—Wei Y. Zhen
*Assistant Examiner*—Matthew J Brophy
(74) *Attorney, Agent, or Firm*—Sprinkle IP Law Group

(57) ABSTRACT

Systems and methods for monitoring the performance of client-server transactions from the perspective of a client. In one embodiment, a JARTA (Java Application Response Time Analyzer) component (which may include JavaScript) is installed on an end user's browser to collect various response time measurements and certain client system information and transmit this information to a server. A JARTA utility on the web server can manage the actions (e.g., insert, modify, and delete) associated with web pages that are ear-marked for JARTA testing at the client browser. The JARTA component may include a Java™ applet that can be downloaded to a client computer along with a web page. In one embodiment, a certain percentage of web transactions to be monitored can be designated using, e.g., a sampling algorithm.

25 Claims, 13 Drawing Sheets

U.S. PATENT DOCUMENTS

| | | | |
|---|---|---|---|
| 6,078,956 A * | 6/2000 | Bryant et al. | 709/224 |
| 6,085,224 A * | 7/2000 | Wagner | 709/203 |
| 6,108,800 A | 8/2000 | Asawa | 714/47 |
| 6,144,962 A | 11/2000 | Weinberg et al. | 717/10 |
| 6,173,322 B1 | 1/2001 | Hu | 709/224 |
| 6,175,869 B1 | 1/2001 | Ahuja et al. | |
| 6,243,105 B1 | 6/2001 | Hoyer et al. | |
| 6,289,378 B1 | 9/2001 | Meyer et al. | 709/223 |
| 6,297,819 B1 * | 10/2001 | Furst | 715/733 |
| 6,324,525 B1 | 11/2001 | Kramer et al. | |
| 6,381,632 B1 * | 4/2002 | Lowell | 709/203 |
| 6,381,635 B1 | 4/2002 | Hoyer et al. | 709/207 |
| 6,411,998 B1 * | 6/2002 | Bryant et al. | 709/224 |
| 6,430,560 B1 | 8/2002 | Yoshida et al. | |
| 6,430,712 B2 | 8/2002 | Lewis | |
| 6,442,607 B1 | 8/2002 | Korn | |
| 6,449,739 B1 | 9/2002 | Landan | |
| 6,459,682 B1 * | 10/2002 | Ellesson et al. | 370/235 |
| 6,484,203 B1 | 11/2002 | Porras | |
| 6,505,246 B1 | 1/2003 | Land et al. | |
| 6,505,248 B1 | 1/2003 | Casper et al. | |
| 6,544,295 B1 | 4/2003 | Bodnar | |
| 6,564,342 B2 | 5/2003 | Landan | |
| 6,625,648 B1 | 9/2003 | Schwaller et al. | |
| 6,643,641 B1 | 11/2003 | Snyder | |
| 6,748,569 B1 | 6/2004 | Brooke | |
| 6,751,654 B2 * | 6/2004 | Massarani et al. | 709/219 |
| 6,901,442 B1 | 5/2005 | Schwaller et al. | |
| 6,912,588 B1 | 6/2005 | Jardin et al. | |
| 7,043,549 B2 | 5/2006 | Breese et al. | |
| 7,194,533 B1 | 3/2007 | DeLuca | |
| 7,197,561 B1 | 3/2007 | Lovy et al. | |
| 7,203,623 B2 | 4/2007 | Garcea et al. | |
| 2002/0059114 A1 * | 5/2002 | Cockrill et al. | 705/27 |
| 2002/0099818 A1 | 7/2002 | Russell et al. | |
| 2002/0120727 A1 | 8/2002 | Curley | |
| 2002/0152221 A1 | 10/2002 | Kauffman | |
| 2003/0046383 A1 | 3/2003 | Lee et al. | |
| 2003/0053420 A1 * | 3/2003 | Duckett et al. | 370/252 |
| 2003/0055883 A1 | 3/2003 | Wiles, Jr. | |
| 2003/0056420 A1 | 3/2003 | Yu | |
| 2004/0030778 A1 | 2/2004 | Kronenberg et al. | |
| 2004/0172381 A1 | 9/2004 | Licon et al. | |
| 2005/0059114 A1 | 3/2005 | Li et al. | |
| 2007/0124463 A1 | 5/2007 | Madhavapeddi | |
| 2007/0174452 A1 | 7/2007 | Nixon | |

FOREIGN PATENT DOCUMENTS

| | | |
|---|---|---|
| WO | WO 98/42103 | 9/1998 |
| WO | WO 99/01819 | 1/1999 |
| WO | WO 01/16753 A2 | 3/2001 |

OTHER PUBLICATIONS

PCT Search Report for PCT/US02/10216 (Related File) dated Apr. 16, 2003.
Kit Letter as enclosed with Patrol® for Internet Services, Version 1.1.01 (2 pages) as released by BMC Software, Inc. on Nov. 17, 2000.
"Patrol® for Internet Services Getting Started" Version 1.1 (198 pages) as released by BMC Software, Inc. on Jun. 23, 2000.
PCT International Search Report date mailed Sep. 6, 2002.
European Search Report for EP 02 72 5446, Mar. 21, 2006.
PATROL Java Applet Response Timer User Guide, BMC Software, Inc., Vers. 1.3, Mar. 8, 2002.
Written Opinion for PCT/US02/10216 mailed Jun. 19, 2003.
Office Action issued in U.S. Appl. No. 10/113,808, filed Oct. 16, 2007.
Office Action issued in U.S. Appl. No. 10/113,322, filed Dec. 26, 2007.
Office Action issued in U.S. Appl. No. 10/113,808 dated Apr. 15, 2008.
Communication Pursuant to Article 96(2) EPC, European Patent Office for Application No. EP 02 725 446 dated Jun. 26, 2006, 5 pages.
Communication Pursuant to Article 96(2) EPC, European Patent Office for Application No. EP 02 725 446 dated Jul. 26, 2007, 5 pages.
Notification of Transmittal of International Preliminary Examination Report for PCT/US02/10023 dated Feb. 6, 2003, 4 pages.
European Search Report for EP 02 71 7757, May 7, 2008.

* cited by examiner

JAVA APPLICATION RESPONSE TIME ANALYZER

RELATED APPLICATIONS

This application claims benefit of priority of provisional application Ser. No. 60/280,170 entitled "System And Method For Internet Service Management," filed on Mar. 30, 2001, by inventors Rick G. Braddy, Ling Z. Zhao, Haifen Bi, Jay R. Goldberg, Philip V. Wiles, Jr., and Troy L. Cline, which is incorporated by reference as if set forth herein in its entirety.

BACKGROUND OF THE INVENTION

1. Field of the Invention

This invention relates generally to computer systems and software and more particularly to the management and monitoring of internet servers and services.

2. Description of Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise.

Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on an individual computer system for the monitoring of particular resources such as CPU usage or disk access. U.S. Pat. No. 5,655,081 discloses one example of an enterprise management system. This patent is incorporated by reference as if set forth herein in its entirety.

Businesses that provide internet-based services have particular needs which are not addressed by the approaches of current enterprise management systems. For example, current approaches may only provide for collection of statistics at the web server and may therefore not be able to piece together a global view of a transaction. Additionally, current approaches may not establish a domain-level view of an enterprise and may therefore be incapable of detecting alarm conditions relating to more than simply individual servers. As more businesses move to the internet to establish e-commerce sites and other e-business solutions, improved systems and methods for monitoring, analyzing, and/or optimizing the sites are needed.

SUMMARY OF THE INVENTION

One or more of the problems outlined above may be solved by the various embodiments of the invention. Broadly speaking, the invention comprises systems and methods for monitoring performance from the perspective of a client.

A JARTA (Java Application Response Time Analyzer) component installed on an end user's browser can collect various response time measurements as well as the client's system information such as IP address, etc. On the web server end, a JARTA utility can manage the actions (e.g., insert, modify, and delete) associated with web pages that are earmarked for JARTA testing at the client browser. The JARTA client software may include a Java™ applet which may be downloaded to a client computer along with one or more web pages from a web server. JARTA data gathered from client computers may be combined with data gathered at server computers to give an administrator an integrated, end-to-end view of web browsing activities. In one embodiment, an administrator may designate a certain percentage of web transactions, sessions, or clients to be monitored using JARTA. The JARTA client software may be downloaded and executed only on that percentage of client computers through JavaScript code downloaded to the client which compares the milliseconds portion of a timestamp to the specified percentage. In one embodiment, specific content may be automatically added to a web page (to "JARTAize" the page) rather than manually through an HTML editor.

One embodiment of the invention comprises a method wherein a software application is transmitted from a server to a client. The software application is configured to monitor one or more performance parameters of the client associated with client-server transactions that are executed. The application may simply collect and transmit performance data back to the server, or it may perform one or more computations on the monitored performance parameters and transmit results of the computations to the server. The application may also be configured to perform limited monitoring of the client's performance. In one embodiment, a sampling algorithm is implemented to cause the application to be active during only a portion of the times it is capable of monitoring client performance.

Other embodiments of the invention may comprise software applications. Such applications may be embodied in a computer-readable medium such as a floppy disk, CD-ROM, DVD-ROM, RAM, ROM, database schemas or the like. It should be noted that the computer readable medium may comprise a RAM or other memory which forms part of a computer system. The computer readable medium contains instructions which are configured to cause a data processor to execute methods which are generally in accordance with this disclosure. A computer system executing the software application would be enabled to perform a method in accordance with the present disclosure and would therefore also be within the scope of the appended claims.

Numerous alternative embodiments are also possible.

BRIEF DESCRIPTION OF THE DRAWINGS

Other objects and advantages of the invention may become apparent upon reading the following detailed description and upon reference to the accompanying drawings.

Figure 1:
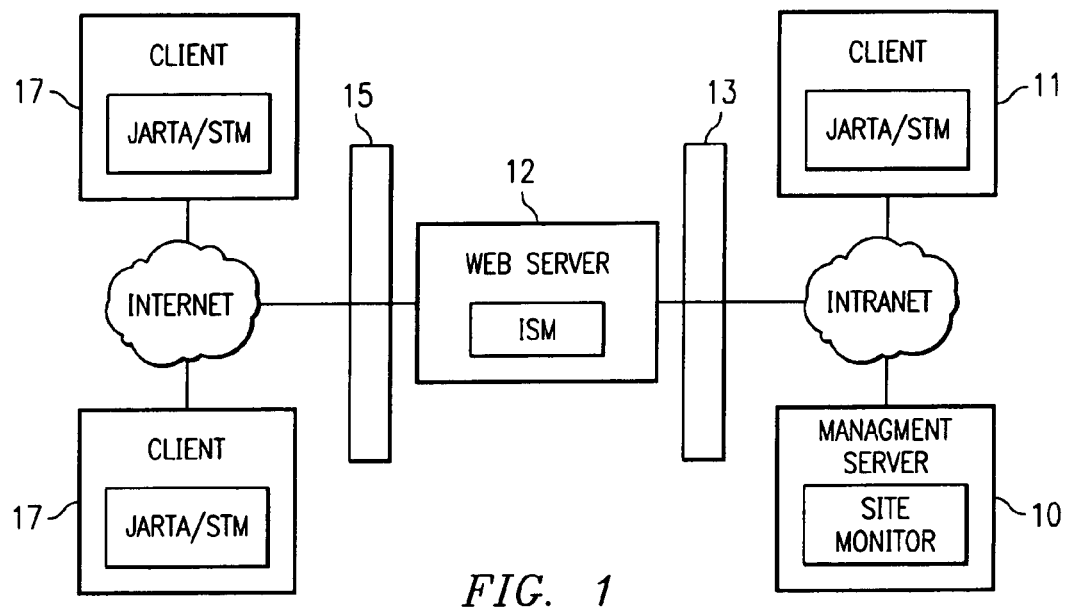
FIG. 1 is a diagram illustrating the structure of a site monitor system in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

Overview

In one embodiment, the purpose of a site monitor is to provide a focal point for managing complex e-business systems. The site monitor component may serve as both a user interface and an integration point for data provided by various e-business management components. The site monitor can provide a "site" viewpoint, showing information at the "domain" and "category levels". For example, the site monitor can provide domain summary information for a domain, which could include data being collected at multiple web servers and data generated by user response components like JARTA and STM, which are described below. The site monitor can also provide management information organized by "categories" according to how the customer wants to view and manage their business; e.g., by line of business (books, auctions, music, etc.), by site function (searches, shopping cart, support, quotes, sales automation), or by most any other categorization a customer may require.

Referring to FIG. 1, a diagram illustrating the structure of a site monitor system in one embodiment is shown. In this embodiment, a management server 10 is connected to a business' intranet. A site monitor runs on the management server. One or more clients 11 are also connected to the intranet. Agents such as JARTA and STM may run on these clients to collect and/or generate data to be sent to the site monitor. One or more servers 12 are also connected to the intranet. The server depicted in the figure is a web server which is connected to the intranet through a firewall 13. ISM agents may be running on the servers for the purpose of collecting and/or generating data on the web servers' performance which can be sent to the site monitor. Web server 12 is connected to the Internet through a second firewall 15 and is thereby connected to one or more clients 17. Clients 17, like clients 11, may have JARTA and STM agents running on them to collect and/or generate data to be sent to the site monitor. Based upon the data collected from the clients and servers.

The site monitor system is intended, in its various embodiments, to meet one or more of the following design goals:
code should be developed using common code practices that lend to scalability, supportability, and sustainability
requires minimal system and network resources
provide adequate debugging capabilities
installation should be as simple and fast as possible
manual configuration should be kept at a minimum
provide specific and helpful error message
gathers data from using XML over HTTP when possible.
calculates summary values for JARTA, ISM, and STM components.
provides user-defined organization of end-user response time data using JARTA and STM categories.
provide views of end-user response time data from JARTA and synthetic transaction monitor components, both in site (domain) and application (category views.
provides integrated "domain view" and "site views" for complex, highly distributed web sites
provides "domain view" information—a summary of all managed domains
provides Service Summary information—a summary of managed services within a domain (e.g., HTTP, HTTPS, FTP, etc.)
provides "site view" information—a summary of the overall site status for an Internet service
provides category views based on user-definable category keywords—a list of user-defined categories which enable customers to determine how user response information is organized
calculates summary values for most important e-business management parameters:
gathers input data from ISM, JARTA and STM; extensible to accommodate other future data sources that report via XML.

Enterprise Computing Environment

Figure 2:
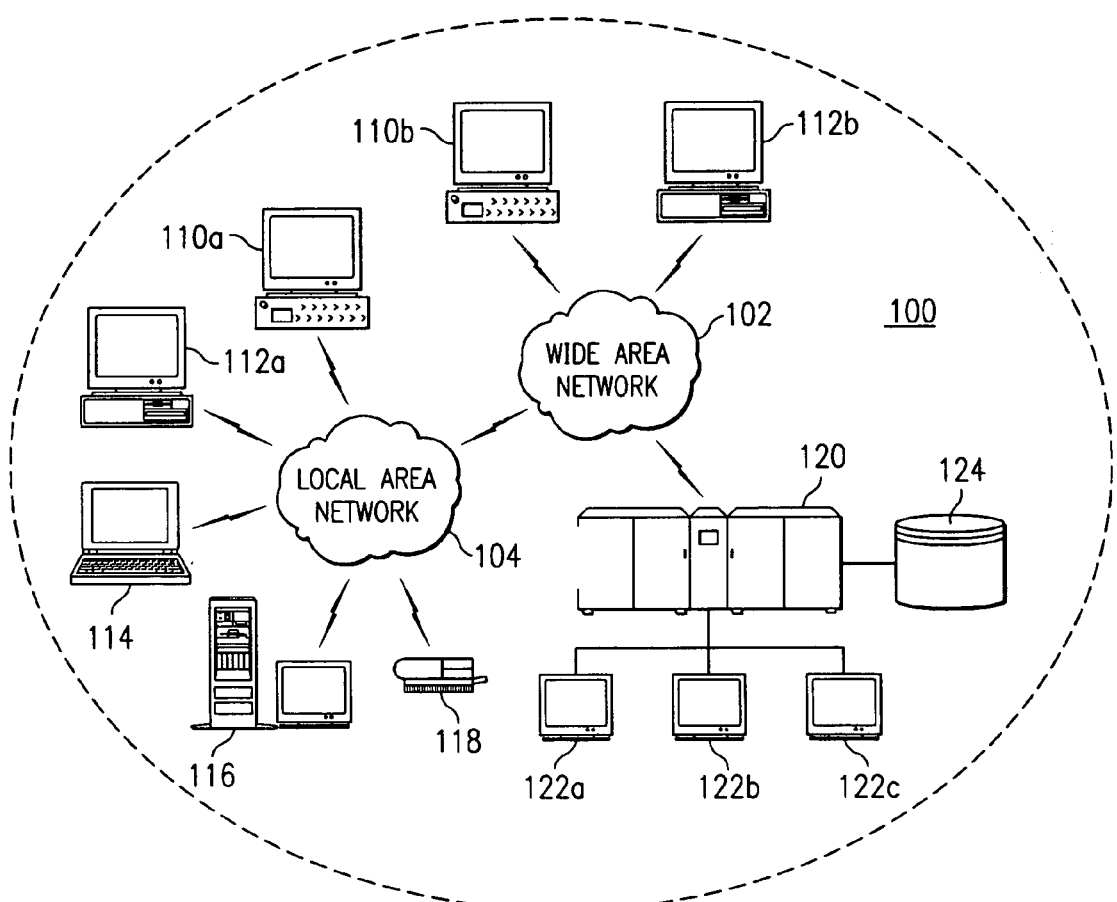
FIG. 2 is a network diagram of an illustrative enterprise computing environment according to one embodiment.

FIG. 2 illustrates an enterprise computing environment according to one embodiment of the present invention. An enterprise 100 may include a plurality of computer systems which are interconnected through one or more networks. Although one particular embodiment is shown in FIG. 2, the enterprise 100 may include a variety of heterogeneous computer systems and networks which are interconnected in a variety of ways and which run a variety of software applications.

One or more local area networks (LANs) 104 maybe included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 2, the enterprise 100 includes one LAN 104. However, in alternate embodiments the enterprise 100 may include a plurality of LANs 104 which are coupled to one another through a wide area network (WAN) 102. A WAN 102 is a network that spans a relatively large geographical area.

Each LAN 104 may include a plurality of interconnected computer systems and optionally one or more other devices: for example, one or more workstations 117*a*, one or more personal computers 112*a*, one or more laptop or notebook computer systems 114, one or more server computer systems 116, and one or more network printers 118. As illustrated in FIG. 2, the LAN 104 includes one of each of computer systems 117a, 112a, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 2, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c may access data stored in the storage device or file server 124 coupled to or comprised in the mainframe computer system 120.

The enterprise 100 may also include one or more computer systems which are connected to the enterprise 100 through the WAN 102: as illustrated, a workstation 117b and a personal computer 112b. In other words, the enterprise 100 may optionally include one or more computer systems which are not coupled to the enterprise 100 through a LAN 104. For example, the enterprise 100 may include computer systems which are geographically remote and connected to the enterprise 100 through the Internet.

Typical Computer System

Figure 3:
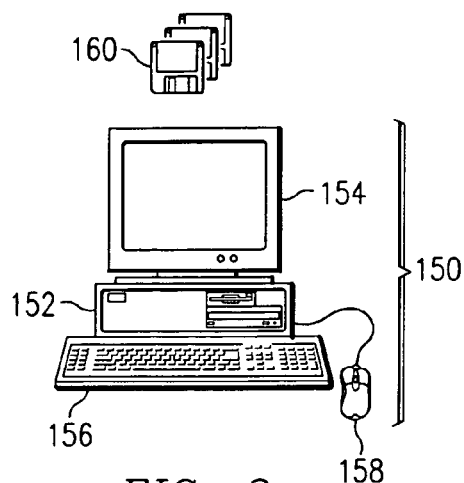
FIG. 3 is an illustration of a typical computer system with computer software programs which is suitable for implementing various embodiments.

The present invention preferably comprises computer programs 160 stored on or accessible to each computer system in the enterprise 100. FIG. 3 illustrates computer programs 160 and a typical computer system 150. Each computer system 150 typically comprises components such as a CPU 152, with an associated memory media. The memory media stores program instructions of the computer programs 160, wherein the program instructions are executable by the CPU 152. The memory media preferably comprises a system memory such as RAM and/or a nonvolatile memory such as a hard disk. The computer system 150 further comprises a display device such as a monitor 154, an alphanumeric input device such as a keyboard 156, and optionally a directional input device such as a mouse 158. The computer system 150 is operable to execute computer programs 160.

When the computer programs are executed on one or more computer systems 150, an enterprise management system may be operable to monitor, analyze, and manage the computer programs, processes, and resources of the enterprise 100. Each computer system 150 in the enterprise 100 executes or runs a plurality of software applications or processes. Each software application or process consumes a portion of the resources of a computer system and/or network: for example, CPU time, system memory such as RAM, nonvolatile memory such as a hard disk, network bandwidth, and input/output (I/O). The enterprise management system may permit users to monitor, analyze, and manage resource usage on heterogeneous computer systems 150 across the enterprise 100. In one embodiment, the enterprise management system may include the PATROL® family of solutions which are products offered by BMC Software, Inc.

Domain

Figure 4:
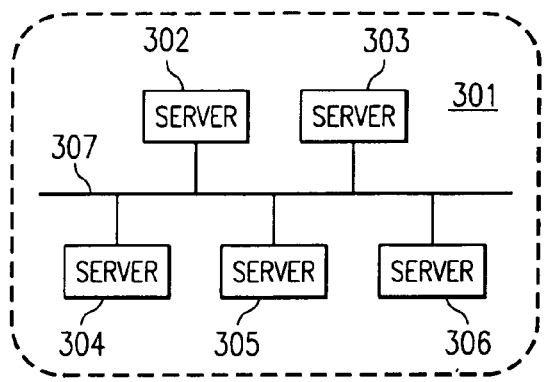
FIG. 4 is a diagram illustrating an exemplary domain in one embodiment.

Referring to FIG. 4, a domain is illustrated. A domain typically comprises a group of servers, each of which performs a particular function for the domain. Each server may perform a different function, or some of the servers may be redundant. As depicted in figure, domain 301 includes servers 302-306. These servers are interconnected by, for example, a network 307. It should be noted that the domain illustrated in FIG. 4 is merely intended to be illustrated and should be construed as exemplary rather than limiting. It should also be noted that an arrangement of servers as depicted in FIG. 4 may support several domains.

Domain 301 may be viewed as a single entity. In many instances, a client maintains this view of the domain. On the other hand, a domain maybe viewed as one of a group of domains, or as a collection of servers. A user such as a site administrator may view the domain in these ways. The site administrator may need to be aware of the performance of the domains, the individual servers, applications running on the servers, and so on. Conventionally, it has been necessary for the site administrator to examine the servers individually and attempt to assess the overall performance of the site based upon this information.

In the present system, however, a site administrator can examine the performance of the entire site at once. This is accomplished by providing a means to aggregate data associated with each of the individual servers into a more central knowledge module. The data in this knowledge module can be categorized and processed to produce information relating to the entire site, selected groups of servers, selected applications, or any of a number of other categories. Thus, it can provide a "domain view" of the system, through which the characteristics of multiple servers and/or clients can be examined, or it can provide an "application view" of the system, through which the characteristics of multiple instances of an application can be examined. These views can be adapted to allow selected subsets of servers, clients or applications to be examined.

Hierarchy of Client, Servers

Figure 5:
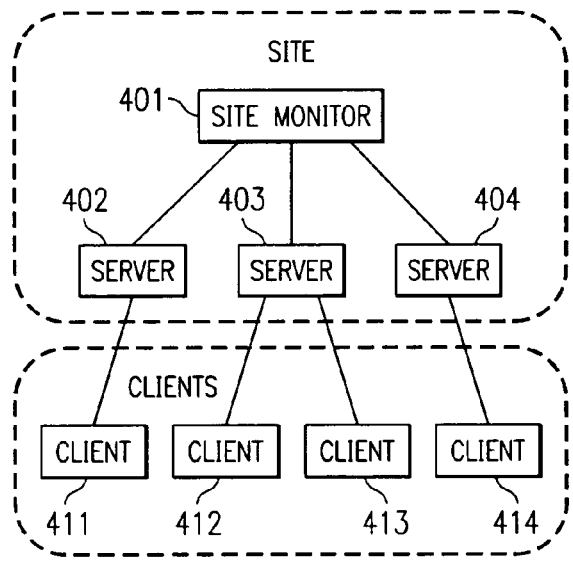
FIG. 5 is a diagram illustrating a hierarchical relationship of clients to servers and servers to a site monitor.

Referring to FIG. 5, a diagram illustrating a hierarchical relationship of clients to servers and servers to a site monitor is shown. In this figure, site monitor 401 is coupled to each of the site's servers, 402-404. Each of servers 402-404 may, at a given time, be servicing requests from one or more clients, 411-414. According to the present disclosure, performance parameters which are measured at client sites 411-414 can be transmitted up through the hierarchy to the respective servers 402-404. All of this information can then be sent from the servers to site monitor 401, which can be used to organize the data according to selected categories. One exemplary category may include all of the servers in the site. With the data organized according to servers, a site administrator can quickly view the performance of the entire system, without the need for examining each server individually. The aggregation of the data before it is viewed by the site administrator may result in savings of time, resources and manpower. The organization of data into site views (information relating to site-wide applications, domains, etc.) is explained in more detail below.

Data Flow

Figure 6:
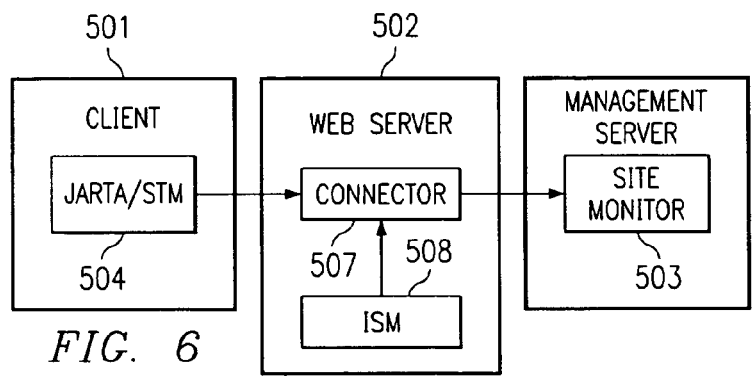
FIG. 6 is a diagram illustrating the flow of information from a client and a server to a site monitor in one embodiment.

The data may be collected from both the clients and the servers in this example. Referring to FIG. 6, a diagram illustrating the fow of information from a client and a server to a site monitor in one embodiment is shown. As indicated in the figure, data may be collected in various ways. For example, data can be collected from client 501 using an agent 504 that executes on the client, measures certain parameters and sends this data to server 502, which then forwards it to site monitor 503. Data can also be collected from server 502 using agent 508. These agents will be described in more detail below. Data from client 501 and server 502 is gathered by a site monitor gatherer component 507 in server 502. is processed in this embodiment by a PATROL SafePassage (PSP) plug-in to server 502. From there, it is passed to a SMC component 509 at site monitor 503.

Site monitor 503 runs on a server that may be referred to as the management server. It should be noted that the management server may provide service to various clients in addition to performing management functions. Thus, just as agent 504 executes on a client of server 502, there may be agents that execute on the clients of the management server. These agents would provide the corresponding client information to the management server without having to pass the information through an intermediate server.

E-Business Management System

The present invention is described herein in the context of an e-business management system. An exemplary system may include three components interoperably coupled together: a site monitor which is designed to provide site-wide views of performance data to a user; a java application response time analyzer (JARTA) which is designed to monitor the performance of client-server transactions executed by a client; and a synthetic transaction monitor which is designed to provide a means for examining pre-defined client-server transactions from the perspective of the client. A PATROL SafePassage (PSP) component may also be used to enhance and ensure the availability of e-business applications in the e-business system. These components will be described briefly here, and then in more detail below.

A site monitor component may provide a focal point for managing complex e-business systems. The site monitor component may include both a user interface and an integration point for data provided by various e-business management components. In one embodiment, the managed components may include ISM (Internet Server Manager), JARTA (Java Application Response Time Analyzer,) and STM (Synthetic Transaction Monitor). Site monitor may provide a "site" viewpoint, showing information at the "domain" and "category" levels. For example, site monitor may provide domain summary information for the domain www.abc.com, which may include data being collected at multiple web servers and by user response components like JARTA and the STM. The site monitor may also provide management information organized by "categories" according to how the customer wants to view and manage their business; e.g., by line of business at www.amazon.com (books, auctions, music, etc.), by site function (searches, shopping cart, support, quotes, sales automation), or most any other categorization customers may choose.

A PATROL SafePassage (PSP) component may provide a software utility that enhances and ensures the availability of e-business applications. PATROL SafePassage includes a web server plug-in known as the "broker." The Broker is used to intercept and process selected requests that flow through a web server. Each such request handled by the Broker is subject to added scrutiny, error detection, and error recovery, as well as load-balancing across a back-end server farm. For example, PSP may examine data for denial-of-service attacks before they reach the web server. PSP may provide a way to reduce the amount of work performed by a web server. In one embodiment, PSP may provide the ability to broker to non-proprietary servers using protocols such as HTTP and HTTPS.

A JARTA component installed on an end user's browser may collect various response time measurements as well as the client's system information such as IP address, etc. On the web server end, a JARTA utility may manage the actions (e.g., insert, modify, and delete) associated with web pages that are ear-marked for JARTA testing at the client browser. The JARTA client software may include a Java applet which may be downloaded to a client computer along with one or more web pages from a web server. JARTA data gathered from client computers may be combined with data gathered at server computers to give an administrator an integrated, end-to-end view of web browsing activities. In one embodiment, an administrator may designate a certain percentage of web transactions, sessions, or clients to be monitored using JARTA. The JARTA client software may be downloaded and executed only on that percentage of client computers through JavaScript code downloaded to the client which compares the milliseconds portion of a timestamp to the specified percentage. In one embodiment, specific content may be automatically added to a web page (to "JARTAize" the page) rather than manually through an HTML editor.

A synthetic transaction monitor (STM) component may facilitate reporting and analysis of a sample end-user experience. Internet transactions maybe recorded, stored, and played back on the original or different client machines for purposes of testing and analysis. An application intercept architecture (AIA) may allow STM and other related solutions to exploit the client platform and Internet Protocol intercepts to gather management information and enhance the performance and availability of the host systems. In one embodiment, STM may intercept calls to an Internet protocol library (e.g., wininet.dll on PCs). In this embodiment, STM may record and play back substantially any action that may be performed using the Internet protocol library.

Site Monitor

Figure 7:
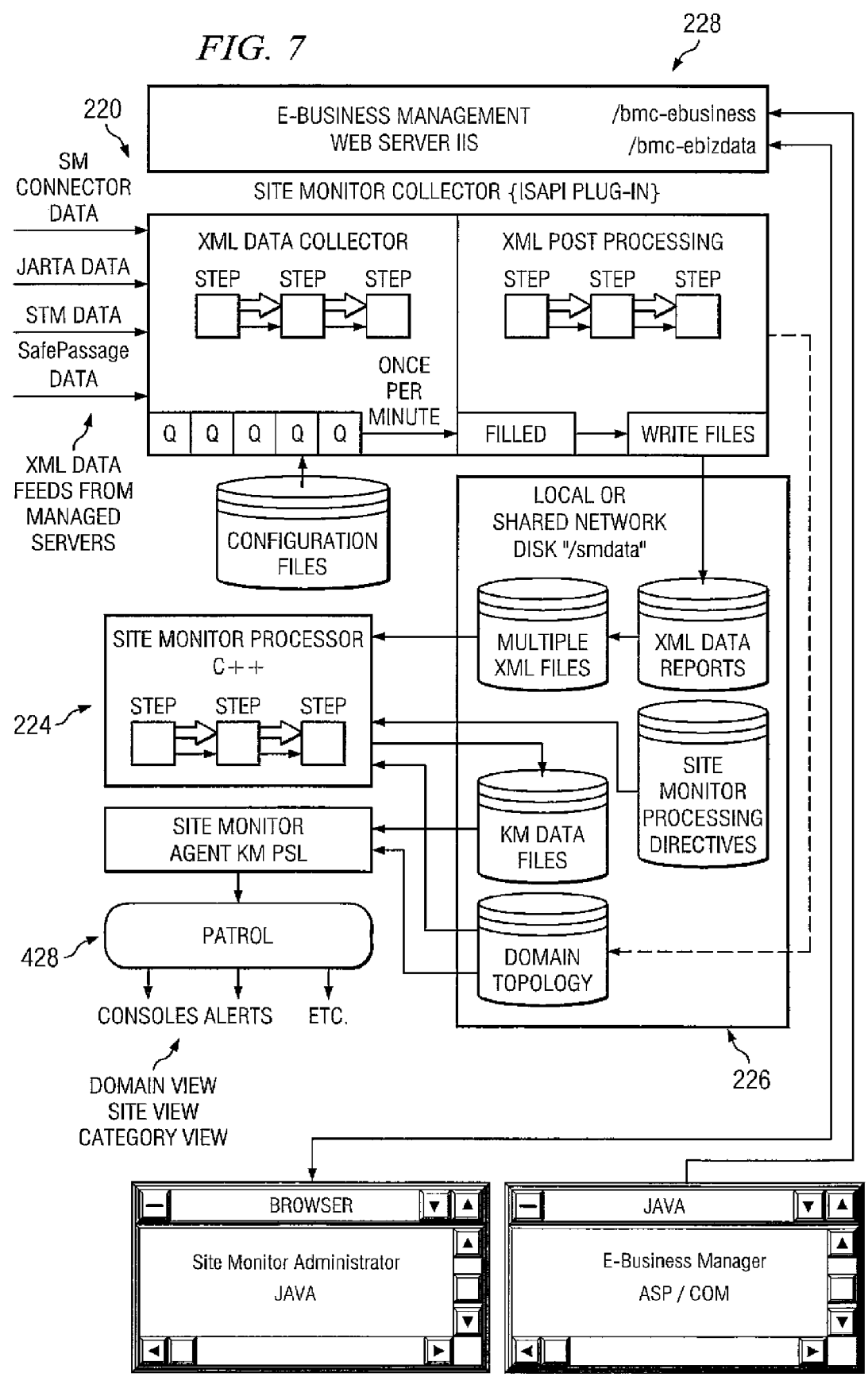
FIG. 7 is a block diagram illustrating an overview of a site monitor system according to one embodiment.

Referring to FIG. 7, a diagram illustrating the structure of a site monitor in one embodiment is shown. The site monitor comprises for primary components: data collector 220; site monitor processor 224; site monitor knowledge module (KM) 226; and interface module 228. These modules are responsible for the collection, processing, storage, organization and display of information relating to the various servers and clients within the site.

In various embodiments, the site monitor may perform the following functions:

receiving XML reports from external JARTA applets, Synthetic Transaction Monitors (STMs), and site monitor Connector KM instances.

receiving XML reports from PATROL SafePassage (PSP) describing performance of web servers when handling STM or JARTA requests.

processing received XML reports into reduced data suitable for consumption by a site monitor KM and a reporting system.

correlating PSP report data with STM and JARTA data.

displaying and/or reporting reduced data via a site monitor KM to provide a aggregated view of site-wide information for a few critical indicators of site health.

displaying and/or reporting reduced and/or raw data from STMs to indicate the health of specific pathways into the customer's web servers from the outside world.

displaying and/or reporting reduced and/or raw data from JARTA to provide information about real-world end-user experiences with the customer's web sites.

In various embodiments, a site monitor (which may include components 220, 424, and/or 426) may provide one or more of the following methods:

determining and reporting internet domain or "site" perspective, determining and reporting application "category" perspective, organizing and tracking internet domains as "sites" and "services", organizing and tracking applications by category, receiving XML data reports from outlying data collection components, tracking user's browser sessions through unique browser session identifiers, tracking user's path through a web site by unique browser session identifier and URL information, tracking user's performance and availability, calculating "site status" across a group of servers, calculating a percentage of servers in a given state across a group of servers, calculating load-balancing distribution across a group of servers, calculating a server's load contribution to a group of servers, aggregating a collection of related information within a logical time window (the "bus" concept), calculating aggregated values across a group of internet servers, calculating aggregated value across an application category, assigning incoming information to an internet domain, assigning incoming information to an application category, collecting and storing large volumes of XML data reports, handling data overrun conditions in high transaction situations, viewing and editing domain or site topology information (SM Admin), representing table-driven processing directives for the aggregation and mapping engine, and extracting existing parameter values from PATROL namespace, associating them with internet site or domain, and transmitting to a server in XML format for processing (SMC).

This list of methods is not intended to be exclusive and is intended to provide examples of the functionality that may be supported by the site monitor.

As depicted in at the left side of FIG. 7, data from various sources is received by an XML data collector portion of SMC 220. In this embodiment, the data collected and forwarded by the respective agents is formatted as XML data. Each agent is configured to format its information into XML reports which are periodically transmitted to the respective server and/or the site monitor data collector. The XML data is queued in memory as it is received. The receipt of the XML reports is given the highest priority so that the receipt of subsequent XML reports is not delayed while they are processed. Periodically, the received XML reports are forwarded to a post processing portion of the SMC. The post processing portion of the SMC categorizes the XML data (e.g., according to keywords in the data) and the rights to data to XML data report files. These files can then be processed by the site monitor processor.

In one embodiment, the site monitor maybe operable to collect and/or process the following parameters: unique session visits; page response time data (average, minimum and maximum); server latency data (average, minimum and maximum); server processing time data (average, minimum and maximum); page view time data (average, minimum and maximum); session time (average, minimum and maximum); page transaction time (average, minimum and maximum); DNS look up time data (average, minimum and maximum); DNS look up errors; DNS look up error rate (average, minimum and maximum); page hits; page errors; and page error rates (average, minimum and maximum).

Site Monitor Collector site monitor collector (SMC) is a web server plug-in. SMC provides the following functionality:

receives incoming XML data reports from various distributed components.

queues incoming XML data reports handles data overrun conditions where XML data reports arrive too quickly or too frequently; data overruns are counted.

segregates XML data reports based upon their data source type (STM, PSP, SMC, JARTA, etc.)

periodically, queued XML data reports are written to XML Data Report files, as described in following sections.

Incoming data reports are categorized by report type (STM, JARTA, etc.) and placed into memory-based queues during this "collection cycle" phase. Periodically (once per minute by default), the SM collector will complete a collection cycle, and enter its "processing cycle". Each processing cycle begins with the creation of a new set of queues that will be used for the next collection cycle, which begins immediately. Then, the processing cycle begins.

The SMC processing cycle consists basically of concatenating the XML data reports from the in-memory queues into disk files. Each disk file contains the set of XML data reports, which were received during the last collection cycle. Once a processing cycle is completes, SM collector awaits the completion of the next collection cycle and repeats the whole process.

In one embodiment, the site monitor collector 220 is an ISAPI component that plugs into a web server such as an Internet Information Server (IIS). It maybe used as a focal point of data aggregation for the site monitor. Data reports from JARTA, Synthetic Transaction Monitor 204 and Internet Server Monitor 212 may converge to the collector 220. The collected information may be dispatched to the site monitor data processor 224 and subsequently to the site monitor KM 226.

The collector 220 may maintain a pool of threads that gets the input data and stores them in queues. Each of the input sources maybe designated a queue. The queues with their original XML data elements may be dumped into the file system periodically at the end of a predetermined time interval. In other embodiments, the file system portion may be replaced by a database. The file formats may be the same as the reports generated by the reporting components (i.e. JARTA). These data files may be picked up by the site monitor data processor component 224 to be processed.

Although the collector is an ISAPI component in one embodiment, in other embodiments the collector may support NSAPI or other web server interfaces and may comprise code that can be leveraged by a Java server middle-ware layer. Additionally, the interfaces to the "write to file" portion may be modularized to permit the plug-in of a module that interfaces with a database or transports the data to any means of data repository.

Heartbeat File. In order to indicate to the site monitor Processor the overall health and status of the SMC, the SMC maintains a "heartbeat.smc" file, which contains the following information:

Last update: Aug. 31, 1999 16:57:14
Total Cycles: 7526
Total Incoming Reports this Cycle: 0
Sequence: 7

"Last update" shows the date and time SMC last cycled. "Total Cycles" indicates the total number of cycles since the SMC was started. "Total Incoming Reports this Cycle" indicates the total number of XML data reports that were actually received by SMC this most recent cycle. The "Sequence" value is the last sequence number used by SMC (increments whether files are actually written or not). These heartbeat indicators are therefore always available and indicate the overall health and operation of SMC.

Site Monitor Processor

Site monitor processor 214 performs the main processing of the received XML data. This processing is focused on the analysis of the data and processing other than categorization. For example, the site monitor processor may perform the following functions:

- performing XML token lexical analysis
- performing XML token parsing and semantic analysis
- converting XML data into C++ data structures
- matching PSP transactions with corresponding agent transactions to create a composite data reports
- recognizing the domains to which incoming composite reports relate ("domain afinity")
- recognizing keywords indicating the applications with which incoming composite reports are associated
- calculating aggregate and derivative parameters relating to the XML reports (i.e., mathematically or statistically analyzing the data)
- creating a information for generation of various views for presentation to a user
- formatting the data provided to the knowledge module so that it can be efficiently processed to generate selected views
- cleaning up (e.g., deleting) completed XML data reports that are no longer needed; and
- various other functions that may be determined to be necessary in particular embodiment.

In one embodiment, the site monitor data processor 224 takes in the output files from the site monitor collector 220. It performs the operations of filtering, correlating and reformatting. The end result is then sent to the site monitor KM 226 in synchronous mode. In one embodiment, in order to optimally filter and correlate data, the developer of this component should ideally have intimate knowledge of how the site monitor parameters are grouped and set in the site monitor KM 226.

In one embodiment, the site monitor processor runs as a Windows NT service. The process flow of the site monitor processor in this embodiment is:

1) initialization of data required for the parser and other configuration values.
2) monitor new incoming data files and start a working thread
3) parsing of incoming XML documents
4) determine the correct domain topology for the incoming samples.
5) in the case of JARTA, match samples and PSP's into one data structure.
6) perform necessary calculations and aggregate data.
7) construct views needed for the site monitor KM
8) send aggregated data to the site monitor KM During initialization some other processing takes place, like loading in the domain topology table and the processing directives table.

Domain Topology Discovery. There are currently two ways that domain topology configuration information may be discovered:

Via XML data report contents—when an incoming XML data report arrives, the domain associated with that report could be inspected to detect new domains. When data reports are sent by the SMC KM, the domain and web server that is being managed should often times be known. There are also cases where the web server instance (within a web server farm) may not be readily associated with the proper external web domain. If the relationship of web server within a domain can be determined from XML data reports, then the SM processor will automatically update the domain topology configuration file to reflect this new relationship.

Via user configuration—users may be required to view, add or change domain and web server topology information manually through a configuration interface.

Domain Topology Table. The domain topology table contains the layout of the site or sites that require monitoring. The table contains information of the customer's site, as well as other external sites (which will be referred to as foreign sites) in which they may want to get comparative information. The information for this table will be stored in XML format to leverage code from the XML parser. This table must contain the following categories and subcategories:

- domain Name (including virtual domains, foreign sites)
- web server names (virtual host name, etc)
- IP address
- port information This table is read upon initializing the site monitor processor. Changes to this table are detected in the XML parser and it is up to the site monitor processor to update the file. The file can also be edited manually for addition of foreign sites as well as a web-based process (possibly in the future).

Processing directives table. In one embodiment, the processing directives table describes each site monitor parameter, determining how that parameter will be processed. This information is stored in XML format in order to leverage the XML parser technology. The following data fields are required in this embodiment:

- XML keyword dictionary—this value matches the XML tag sent by the various measurement components (JARTA, STM, PSP, and Gatherer).
- corresponding SM KM PATROL instance and parameter name—these are the PATROL application instance and parameter names, which correspond to each value, represented within PATROL.
- algorithm used to calculate the site monitor value—this value determines which algorithm will be used to calculate the site monitor aggregate value.
- view(s) used to display site monitor value: domain, site, server, category—this value indicates which site monitor KM view(s) will be used to render the aggregated value within PATROL.

Site Monitor Knowledge Module (KM)

In one embodiment, the KM will extract data values from the PATROL agent namespace and create an XML report containing the names and the data values that were extracted. It will extract data values as specified by a configuration file. After the report is created, the KM will call an executable program, which will send the XML report to a web server via an HTTP POST operation. The KM will perform the above process on a regular interval. This interval will initially be set to one minute. The interval will be modifiable by changing the polling interval of the parameter that executes the information retrieval process.

In one embodiment, the KM's configuration file will specify the absolute path within the agent namespace for each data element to be returned. Since much data to be returned will be from application instances that are not known when the configuration file is created, a wildcard character "*" will be used in the configuration file to indicate that the specified value should be returned from all application instances existing within the PATROL namespace.

In one embodiment, the KM will create an XML report that indicates, for each piece of data returned, the absolute path to the data value within the PATROL namespace and the value. If a specified piece of data did not exist in the PATROL namespace, neither the path nor the value will appear in the output XML file.

In one embodiment, the KM will transmit the XML report to the site monitor server by calling an executable program that will perform an HTTP POST of the XML report. The executable will return a status (success/failure) to the KM. If the HTTP POST failed, the parameter will retry the POST once. If the second POST fails, then the parameter will set itself into the ALARM state, destroy the XML report file, and return to its normal processing. On the next cycle, if the HTTP POST is successful, the parameter will set itself back to the OK state. There will be no caching of XML reports that could not be posted.

Site monitor processor 214 generates data files for use by knowledge module agent 226. The knowledge module agent is responsible for preparing the information in the knowledge module data files so that it can be presented to a user of assistant. The knowledge module agent is required to perform the following functions:
  reading the contents of the appropriate knowledge module data files
  processing this information to generate selected site monitor views
  recognizing and handling new application instances as well does that no longer exist
  calculating any remaining aggregate or derived parameters that are necessary
  triggering appropriate patrol events and alarms
  driving user interface ancillary functions (reports console displays, call outs, etc.), and
  deleting knowledge module data files when they are no longer needed.

In one embodiment, the KM 226 is a single-threaded component that cannot process information as quickly as it arrives. Therefore, the collector 220 may effectively act as a queue for the incoming data. The collector 220 may receive input from all its sources via the PSP proxy in asynchronous mode. The collector 220 may accomplish its asynchronous "reads" from the IIS web server as follows. First, set a special asynchronous callback function by calling the HSE_REQ_IO_COMPLETION support function, through the ServerSupportFunction function. Second, request that IIS begin the asynchronous read operation by calling the HSE_REQ_ASYNC_READ_CLIENT support function, using the ServerSupportFunction function. Third, exit the HttpExtensionProc function, and indicate that the collector is waiting for further callbacks by returning the status code HSE_STATUS_PENDING. Fourth, when IIS has completed the read—or has generated an error trying to read—IIS will call the asynchronous callback function specified in step 1. The collector can now perform any processing on the newly read data, and return to step 2 if there is more data available.

Fifth, once there is no more data available, and the collector has completed any cleanup necessary for the current request, the collector informs IIS that it is done with the request by using the ServerSupportFunction HSE_REQ_DONE_WITH_SESSION.

The site monitor KM 226 may be responsible for interacting with PATROL 428. This may include data reports from JARTA, STM 204, and ISM 212. It gets its information from the site monitor data processor and sets parameter values in the PATROL name space. Since the PATROL agent may be single-threaded, most of the queuing may be done at the site monitor collector/data processor side.

As indicated above, the site monitor can provide a user with site views of data. That is, the views include data that is site-wide. Site views may include domain views, which display information for selected domains, sub-domains or other groupings of servers and/or clients. Site views may also include application views, which provide information relating to particular applications on a site wide basis. The site views may also include views that incorporate elements of both domain and application views.

Domain View

Figure 8:
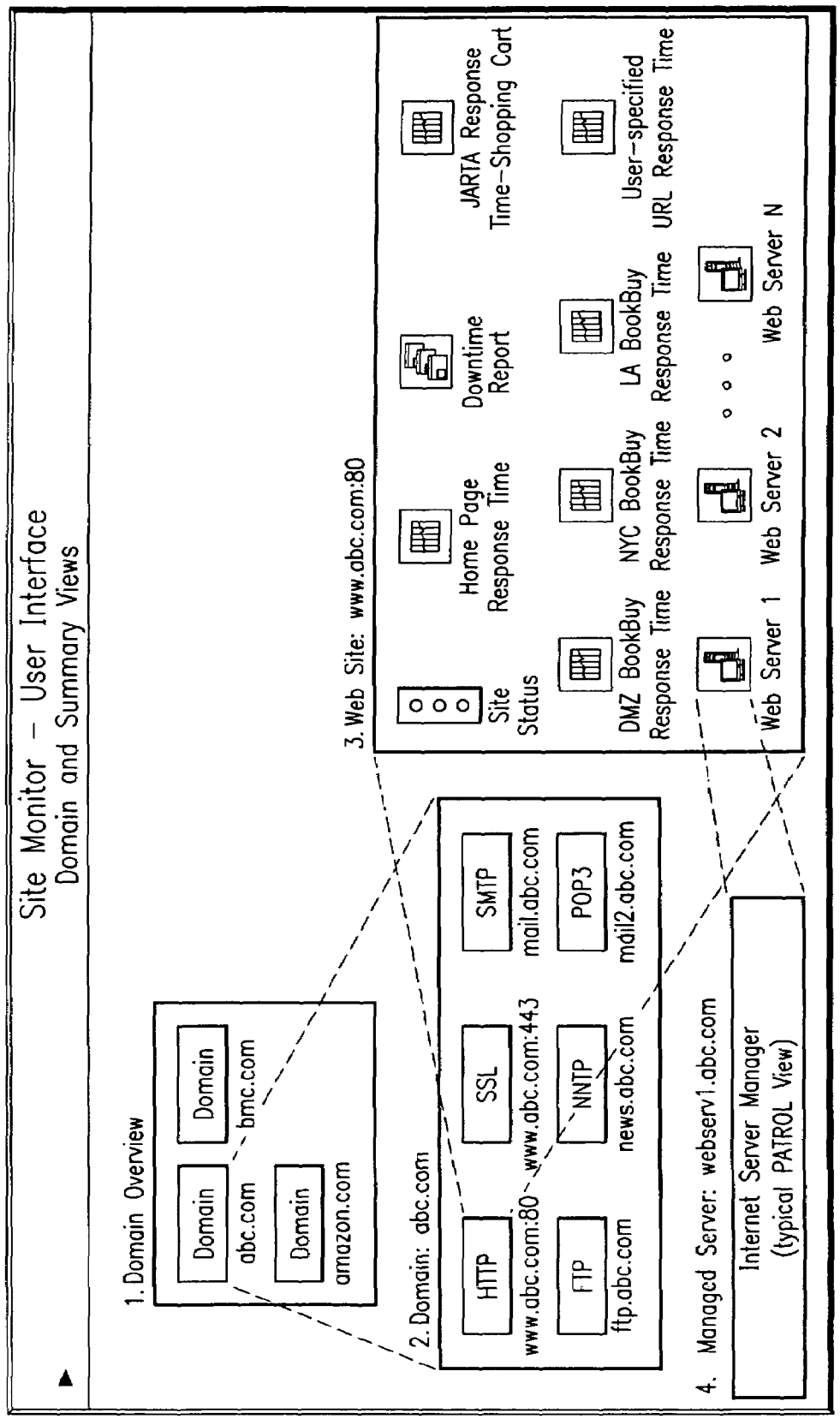
FIG. 8 conceptually depicts how Domain Views could be organized in one embodiment.

In one embodiment, the "domain view" is a collection of derived parameters that represent the status of a domain (e.g. "abc.com"). A list of all managed domains must be discovered, from local DNS servers and/or the ISM (to be determined during design). FIG. 8 conceptually depicts how domain views could be organized. A configuration interface can be provided to enable customer configuration of which ISM instances belong to which domains. Domains can be discovered by way of XML data reports received from ISM, JARTA and STM. Domains that are not being managed directly by ISM, but that are the subject of STM transactions (e.g., competitor sites) can also be tracked as Domains (even though there may only be STM data available within such "foreign domains").

The domain overview includes a list of managed domains. This list of domains is be based upon a combination of domain discovery based upon contents of XML data reports and user configuration.

Within each managed domain instance, the various managed services are shown. This list of managed services is populated based upon the services discovered based upon incoming XML data report contents. Each managed service is shown separately (e.g. www.abc.com:80 is unique from www.abc.com:81).

Each Internet service within the domain may provide a "site view", the summary of the overall site's aggregated information and state. Referring to FIG. 8, a diagram illustrating the relationship between various domain views in one embodiment is shown. This figure depicts:
  overall site status
  home page response time for entire site
  errors for the entire site (not shown)
  user-specified "content-check" URL response times (ISM)
  JARTA and STM transaction information applicable to this site
  Internet service (web server) icons for each managed server The domain overview shown in FIG. 8 is a list of domains. FIG. 8 shows the conceptual organization of domain information, not necessarily what this information will look like in a particular user interface. A subset of critical ISM parameters may be duplicated in web server (ISM instance) icons, as shown in the figure.

In one embodiment, the following minimum ISM instance parameters will be maintained for each such web server instance at this site level: httpStatus; httpDownTime; httpResponseTime; httpErrors; and RequestPercentage—the percentage of total requests (across all web servers in the farm) which were handled by this web server instance (an indication of load balancing effectiveness)

The user is presented in this embodiment with the following hierarchy of information:

Domain (e.g. abc.com)
    List of Managed Services
    HTTP
    SSL
    SMTP
    POP3
    Etc.

Once a particular domain service is selected, a more detailed summary of that service may be shown as the Service View.

Referring to the example labeled "Step 3. www.abc.com: 80" in the figure, each such service is summarized to provide appropriate summary information for that service. In the example for HTTP, the following may shown:
    service status: OK, WARNING, FAILED
    JARTA response times for key pages (average and max)
    STM response times for key pages (average and max)
    response time for a user-specified URL (from ISM)
    summary information for each managed web server.

Each managed service other than HTTP should be represented by an appropriate set of summary statistics, preferably including at least the following: service status: ok, warning, failed; response time (average and max); error rates (average and max); and such other key parameters for that service as may be determined during the design phase.

Application View

Figure 9:
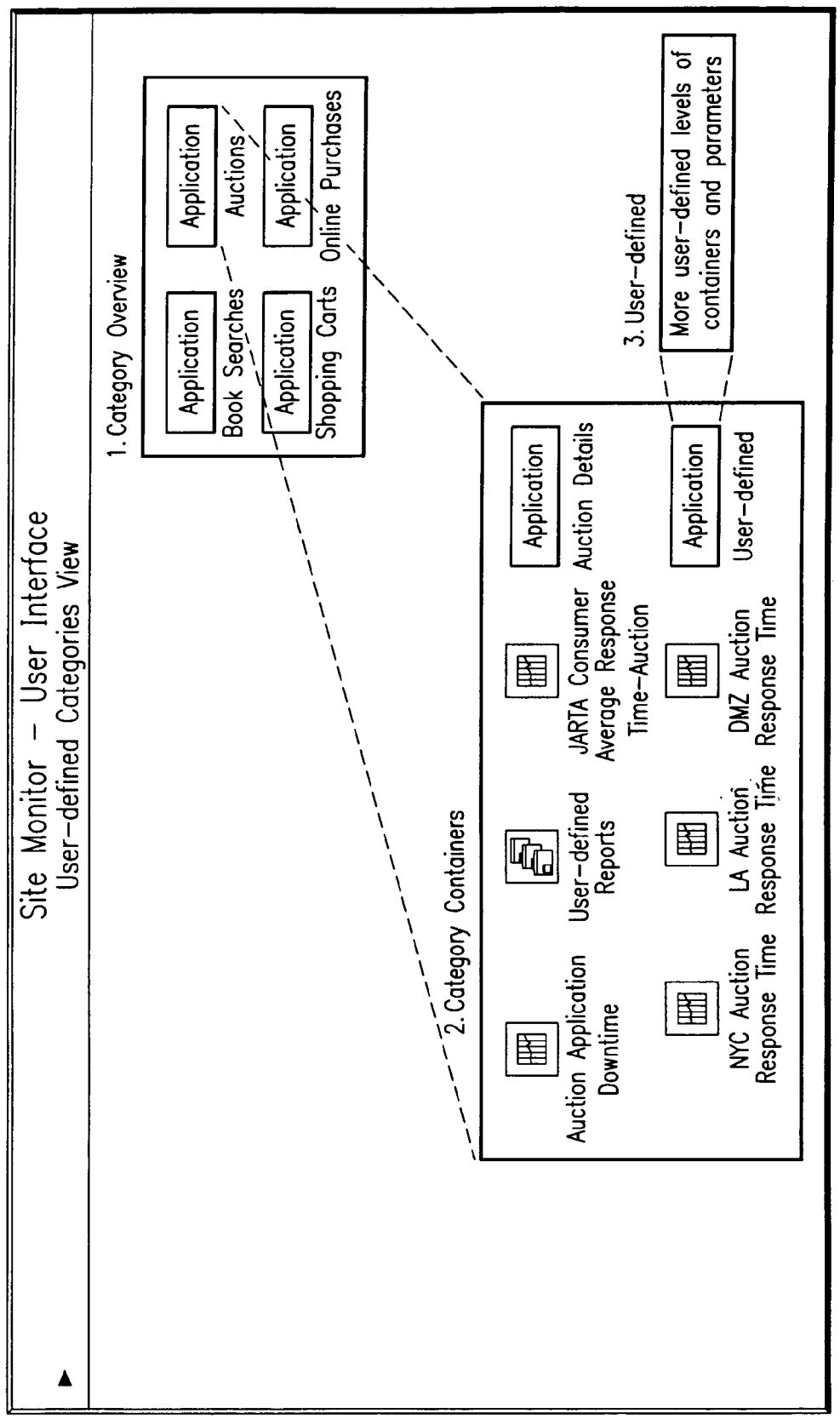
FIG. 9 conceptually depicts how Application Views could be organized in one embodiment.

Provides user-definable category views for information gathered from end-user response time components. This enables customers to determine how user response information is organized. JARTA and the STM report their observations to the site monitor. Each such observation report can contain certain category keywords that are used to build user-defined "category views". A category view is an arbitrary application class instance that will be used as a container for JARTA and STM information. FIG. 9 conceptually depicts how application views could be organized. Consider the following conceptual view and discussion:

The user has defined the following "category keywords" on various JARTA pages:
    /book searches
    /shopping carts
    /auctions
    /online purchases Each of these keywords gets reported along with the JARTA observation (data report). These keywords result in appropriate application class instances being created and populated with the derived parameter values associated with JARTA observations. It is possible for each observation's data report to contain multiple category keywords, which can be either comma-delimited or space-delimited when specified by the user. Category keywords can also specify a hierarchy; e.g., "auctions/paintings", "/auctions/cars", "/state/NYC", "/state/CA".

Category views provide a very flexible way for customers to determine how they organize and view service level information collected from user response time components like JARTA and STM. In the future, it may also be possible to collect additional application service information from other components, such as application server monitors, for example.

Site monitor user Interface. Once the site monitor KM processes the data according to one or more site views, the data is displayed via a user interface. The user is also able in one embodiment to select the desired views and even to specify particular site views that are desired. This functionality may be achieved through the use of an interface such as PATROL, produced by BMC Software. The operation of this interface is described in detail in U.S. Pat. No. 6,141,759 titled "System and architecture for distributing, monitoring, and managing information requests on a computer network," which is incorporated by reference in its entirety as though fully and completely set forth herein.

Configuration Interface. It maybe useful in one embodiment to provide a configuration user interface. This interface may be developed as a Java applet and may provide a browser interface. It is contemplated that this user interface would be registered with the e-business manager component as "site monitor administration" and will be accessible from the e-business management interface.

Internet Service Management System

As described above, the site monitor may receive data from various sources. In one embodiment, the data received by data collector 220 comprises XML reports from such agents as a JARTA and a STM. These types of data are indicated as inputs to the data collector depicted in FIG. 7. Other inputs depicted in this figure include data from an Internet server monitor ("ISM Data") and from a PATROL SafePassage plug-in ("PSP Data"). The generation and collection of this data is explained in detail below.

An Internet service management system may collect actual user transaction times as well as system information from the end user. In addition, the Internet service management ("ISM") system may collect web server latency and processing time data. The Internet service management system may include a plurality of components which are discussed below.

Figure 10:
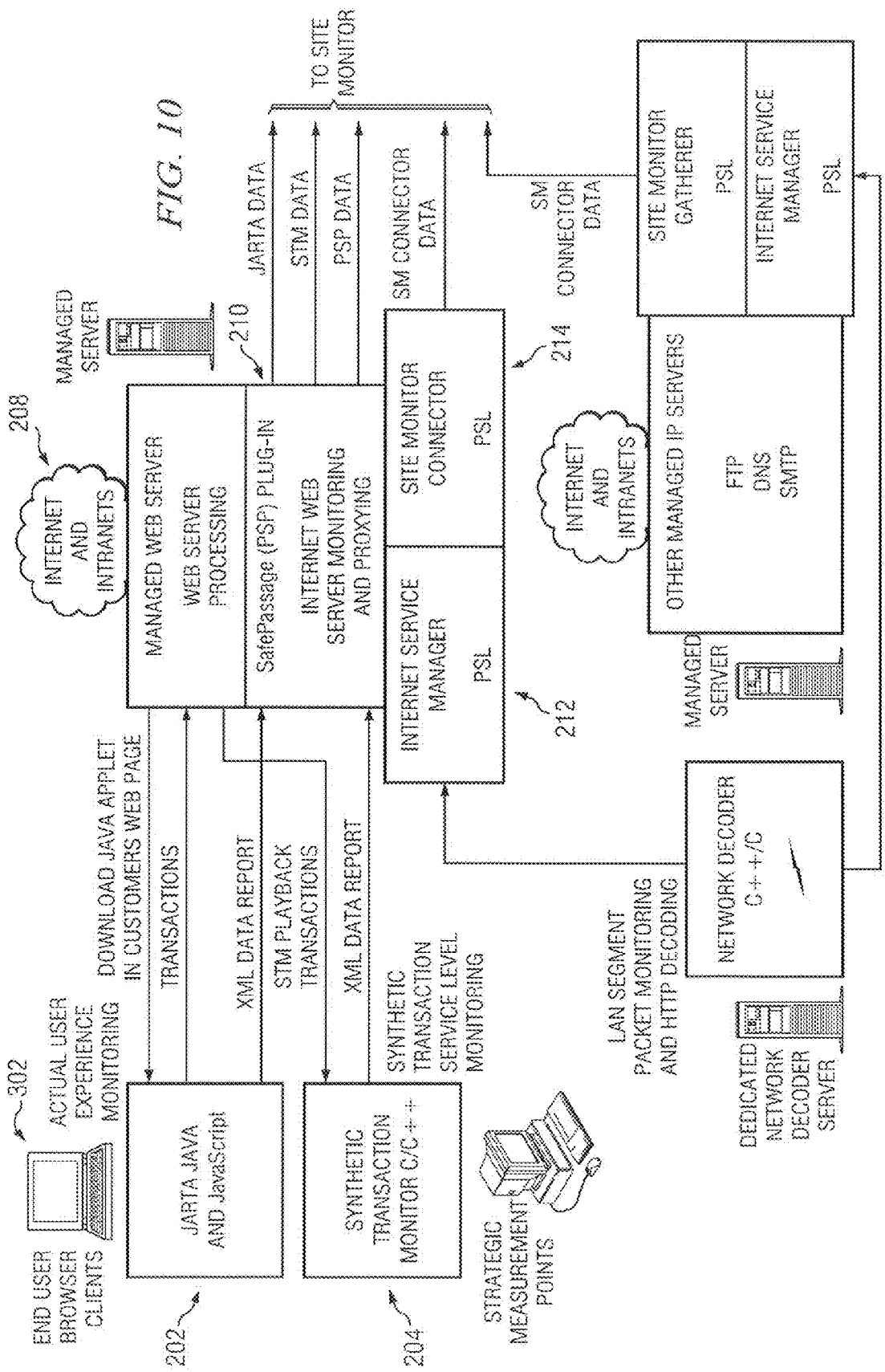
FIG. 10 is a block diagram illustrating an overview of an internet service management system according to one embodiment.

Referring to FIG. 10, a diagram illustrating the collection of data by an Internet service management system for processing by the site monitor is shown. This figure depicts a web server 208 that interacts with a JARTA agent 202 and an STM agent 204. WebServer 208 resides on server hardware and includes plug-ins for internal WebServer monitoring and proxying (such as Patrol SafePassage), Internet server management, and gathering of XML data to forward to the site monitor. These plug-ins are indicated by reference numerals 210, 212 and 214 in FIG. 10.

External performance data is generated by the JARTA and STM agents. Each of these agents is designed to monitor the performance of the server from the perspective of the client. This provides a more accurate indication of server performance than monitoring which occurs internally (i.e., within the server) because this monitoring includes the effects of network performance and other factors which are external to the server. Data on performance internal to a managed server is generated by an ISM. This data is forwarded to the site monitor along with the JARTA and STM data.

Patrol SafePassage (PSP)

Various incoming data reports arrive at the E-business Management web server. The PSP plug-in intercepts and inspects selected requests, routing appropriate SMcollector data to a new SM collector "filter module" that is running within the web server and PSP plug-in. This PSP plug-in will be the standard PATROL SafePassage code base. For its default use in site monitor collector role, PSP will be installed with the e-business management server collection of components. It will be pre-configured to handle both site monitor collector requests and normal PSP brokering functions.

The PATROL SafePassage (PSP) plug-in technology has been leveraged to construct site monitor collector. PSP normally intercepts web requests, then re-routes those requests to one or more "back-end servers", which are typically HTTP servers. PSP is built upon the patent-pending "Webintegrator" foundation technology. Webintegrator provides a general-purpose web server plug-in framework for intercepting and processing requests for any purpose. site monitor collector builds upon that WebIntegrator framework by utilizing its "filter module" facility.

Filter modules provide a means of plugging in local processing functionality directly within the WebIntegrator (PSP) framework; i.e., a plug-in within a plug-in.

Any PSP installation can be configured to also be an SMC plug-in. Both classical PSP brokering capabilities and SMC filter module processing can readily co-exist. PSP configurations rely on a concept known as "directory mappings". Each PSP directory map represents whether and how a particular URL path will be processed by PSP. Enabling the SMC functionality within PSP is very simple.

JARTA

In one embodiment, the JARTA client portion 202 resides and operates in the browser 302. It may include a mixture of JavaScript and Java applets tied together to collect, correlate, and report information. Java applets may behave differently in different browsers such as Netscape Navigator and Microsoft Internet Explorer, especially in the context of persistent memory. Additionally, due to various security restrictions applicable only to unsigned applets, JARTA may use JavaScript to generate and gather information and store it as a browser "cookie." This information may include such things as: a unique session identifier (a result of mixing timestamp of current time and a random number); a page view start up time; a session start up time; a page transaction start up time; a browser user IP address; a browser user locale; category keywords; and a transaction description.

A JARTA component 202 installed on an end user web browser may collect various response time measurements as well as client system information (e.g., IP address, etc.). A managed web server may use a JARTA utility (not shown) to manage the actions (e.g., insert, modify, delete) associated with web pages that are ear-marked for JARTA testing at the client browser 302.

In various embodiments, a JARTA may provide one or more of the following functions:

determining and reporting browser client-side information;
downloading transient JARTA agents to selected browsers;
identifying a JARTA transaction by name, URL, and/or page title;
determining and using a unique session identifier to represent each browser user and browser session being tracked and monitored;
determining a percentage of browser users that will be tracked and monitored;
calculating elapsed client browse time;
tracking end-user browser response time from one page to another;
determining DNS (domain name server) lookup response time;
tracking user page view time;
tracking user session elapsed time;
tracking user actual path through a web site (by URL);
reporting observations to a server (e.g., via XML);
server-side detection of a tracked transaction (e.g., by a cookie);
identifying pages that will be tracked;
identifying page transitions that will not be tracked;
storing local information used to track and report on a browser session;
ensuring the integrity and validity of unique session identifiers;
identifying and reporting browser language setting;
identifying and reporting browser country setting; and
specifying an Application Category for a web page(s).

This list of methods is not intended to be exclusive, but rather this list is intended to provide some examples of the functionality that may be supported by JARTA. Other methods not specified may also be used.

In a production environment, a web administrator may establish criteria as to where and when to enable/disable/insert/modify/delete the JARTA client component 202 when the web server 208 serves a page. A customer may bring up a browser session and point to a JARTA-enabled web page. The JARTA client component 202 may arrive at the customer's browser side and perform collections of JARTA data, which may includes the page transaction elapse time, page view elapse time, page URL, and other information. An enhanced PSP module 210 at the web server 208 may take measurements of web server latency and processing time and send the information to the site monitor 220. The JARTA component 202 at the browser side may send the collected data back to the web server 208. PSP 310 in turn may re-direct the data to the site monitor 220. The results may then be processed by both the site monitor collector 220 and site monitor data processor 224, and then passed on to the site monitor KM 226 which in turn stores the information in the namespace for PATROL 228. Alarm thresholds and other management parameters can be subsequently established.

In one embodiment, the client JARTA component 202 may be operable to collect the following information: session identifier, unique per user session; page URL; page view elapse time—time user spent on this page; session elapse time—time the user has spent on this session; page transaction elapse time—the time it takes from the point of pressing the "submit" button to response returned; Browser IP address; browser locale; DNS lookup elapse time; DNS lookup status code; category keywords; and transaction description.

Figure 11:
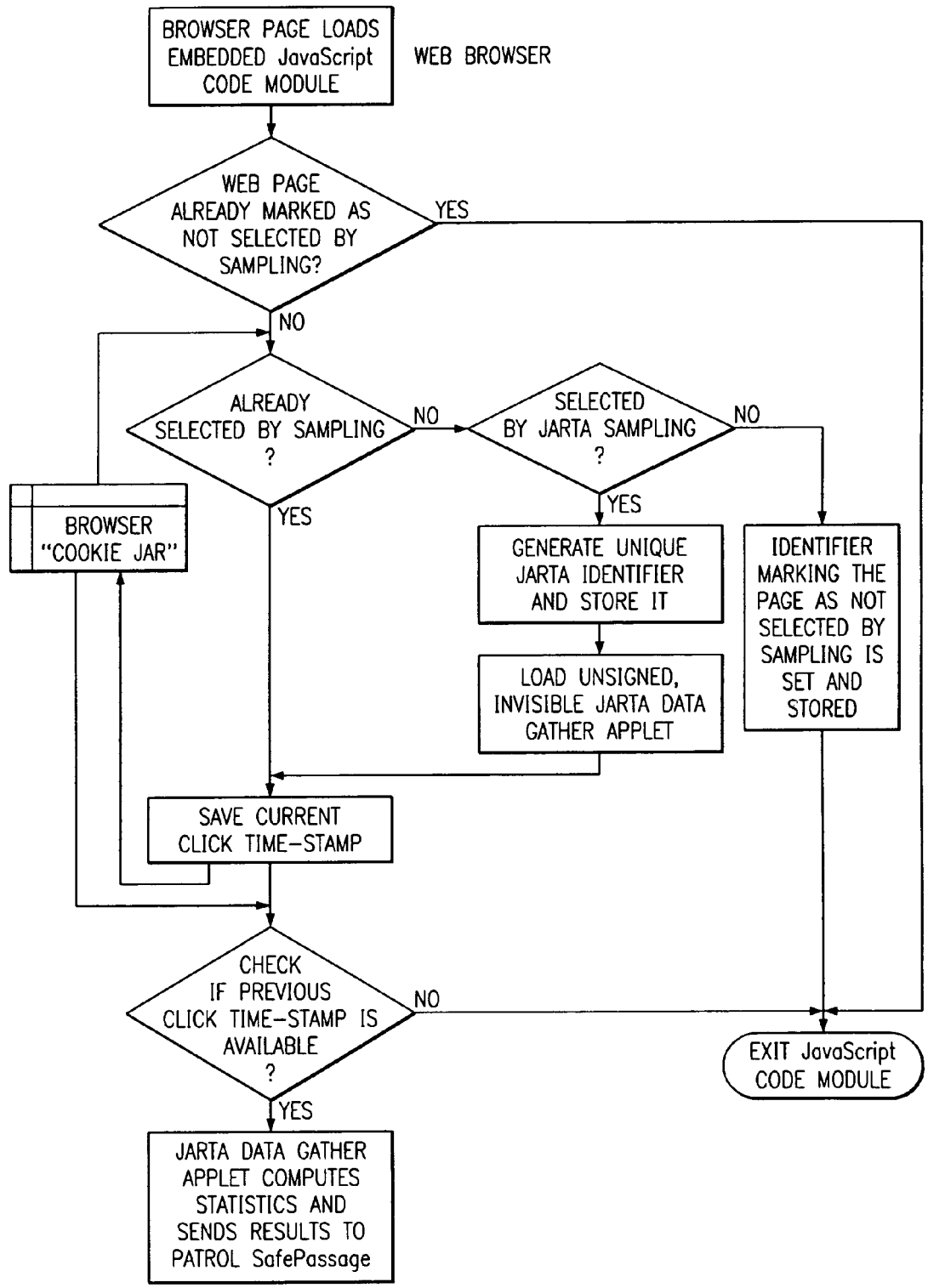
FIG. 11 is a flow diagram illustrating the operation of a JARTA in one embodiment.
Figure 12:
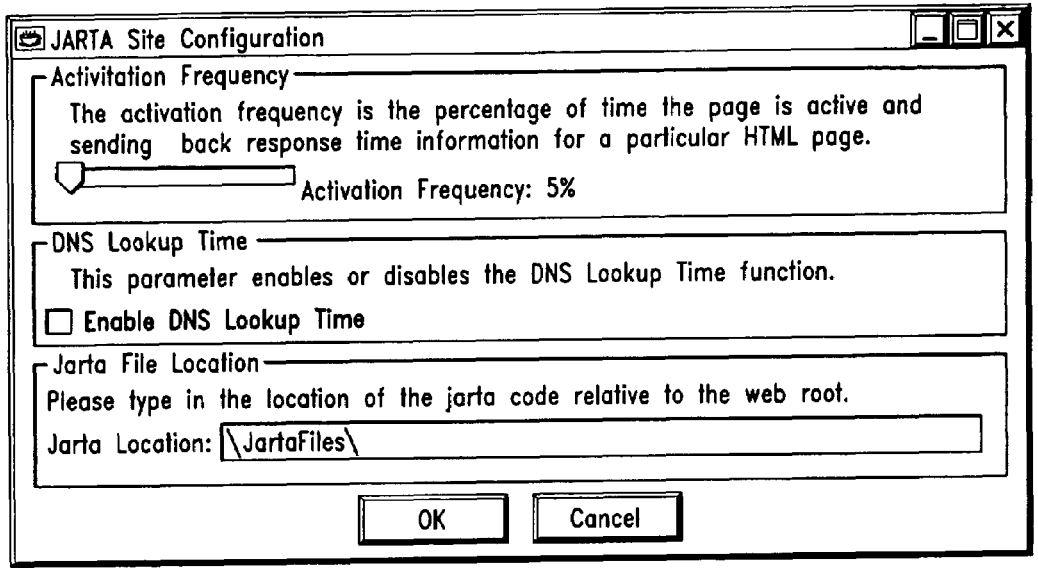
FIGS. 12 through 15 illustrate exemplary dialog boxes for one embodiment of a JARTA editor tool.
Figure 13:
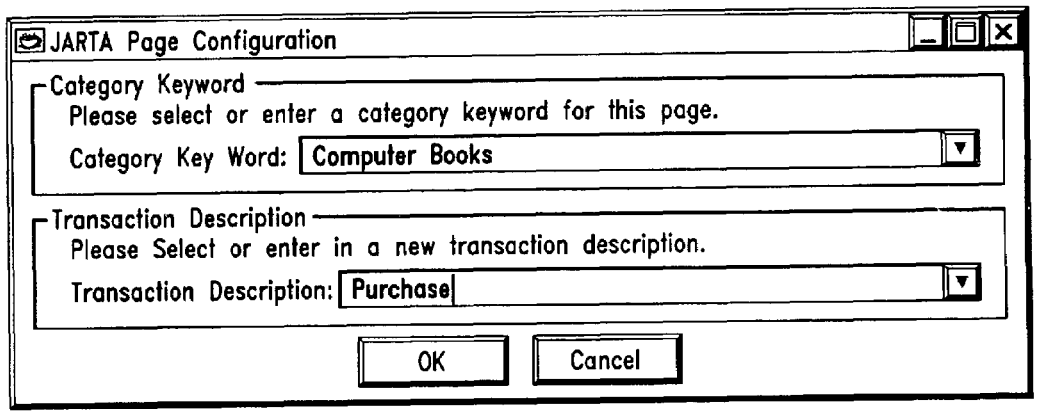
Figure 15:
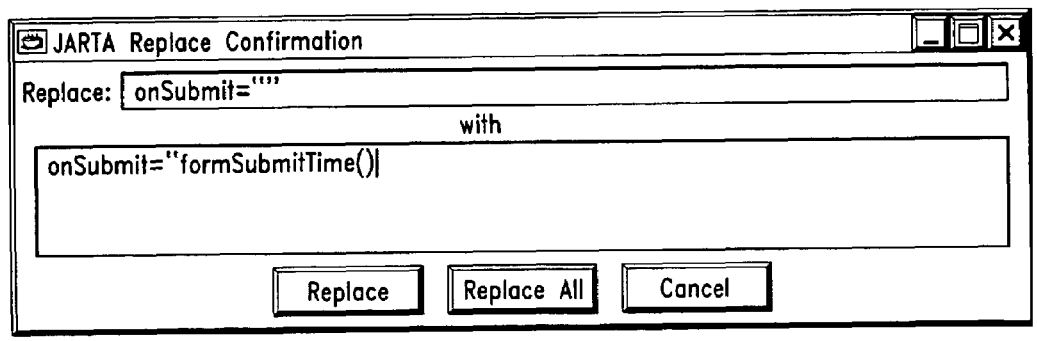
Figure 14:
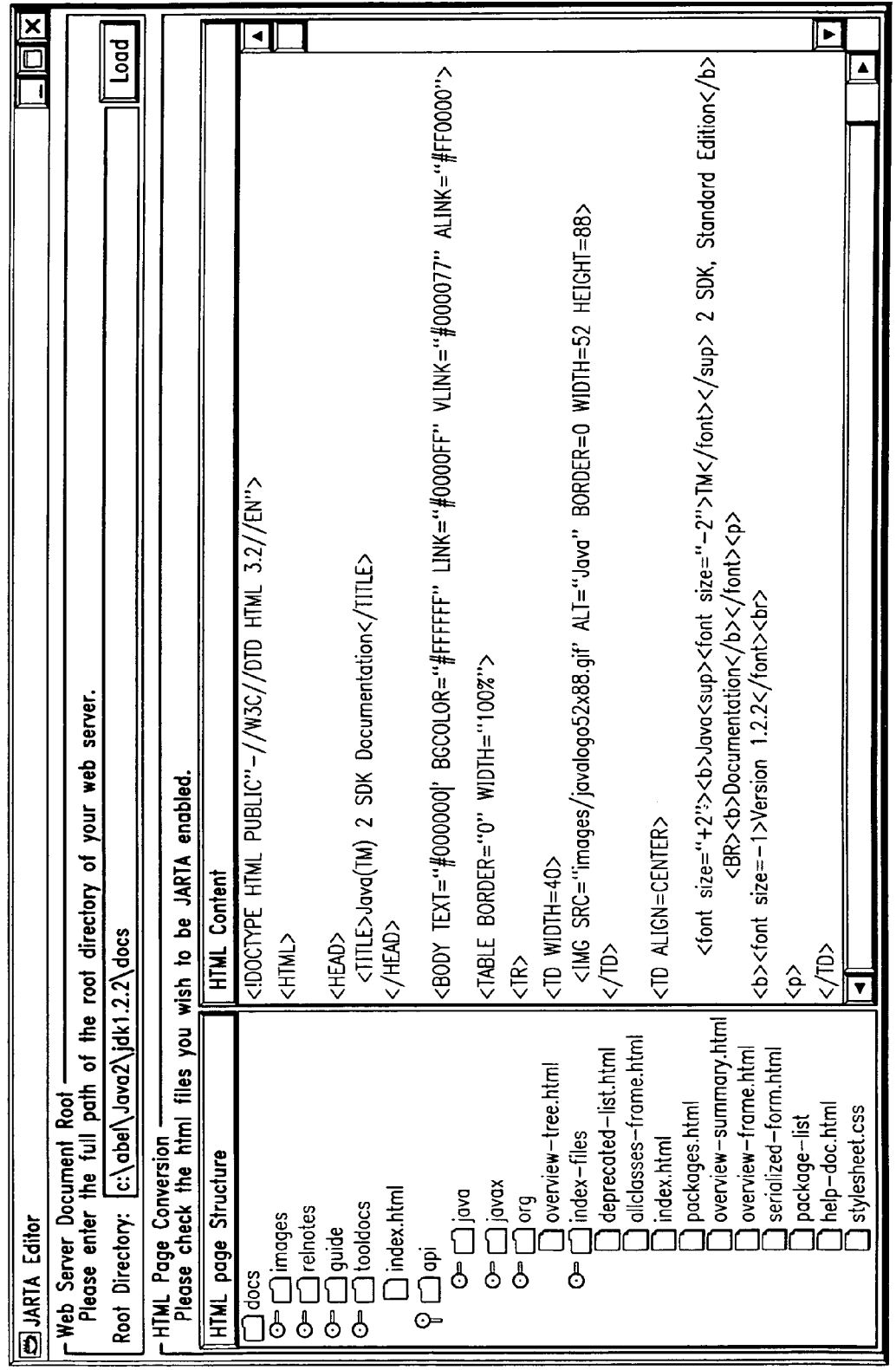

Referring to FIG. 11, a flow diagram illustrating the operation of a JARTA in one embodiment is shown. Initially, a browser on a client computer loads an embedded JavaScript code module. The JARTA will not necessarily execute every time it is loaded. Instead, a sampling algorithm is used to cause the JARTA to execute only a portion of the time. This is done by marking the page in which the JARTA is embedded as selected, or not selected, for sampling.

If when the page is loaded it has already been marked as not being selected for sampling, the JavaScript code module will be exited. If the page has already been marked as selected for sampling, a timestamp associated with the current click will be stored as a browser cookie. If a previous timestamp for the JARTA is available in the cookie jar, an unsigned, invisible JARTA data gather applet will gather data, compute statistics based upon the interval between the timestamps and transmit the results to the web server (which will forward them to the site monitor).

It should be noted that the applet does not need to be invisible, but it is typically the case that the user desires that the look and feel of the web pages not be changed by inclusion of the applet. Since the applet is invisible, the user does not ordinarily know or care that the applet is running on the browser.

If the page has not already been marked as either selected or not selected for sampling, the sampling algorithm will be used to determine whether it should be selected. If it is not selected, the page is marked accordingly and the JavaScript code module is exited. If it is selected, the page is marked accordingly. A unique JARTA identifier is also generated and stored, and an unsigned, invisible JARTA data gather applet (mentioned above) will be loaded. The timestamp associated with the current click will then be stored in the browser's cookie jar and the JavaScript code module will be exited.

Sampling algorithm. As described above, it may be desirable to execute the JARTA for only a sampling of the clients. This may relieve the loading that may arise from executing the JARTA in every instance. This may be valuable, for example, to a high-traffic e-commerce provider who needs only a sampling of the available data. Client-side scripting may be used to achieve this sampling. A sampling algorithm according to one embodiment is as follows. A percentage number maybe supplied by the e-commerce provider. This percentage may be embedded inside the client-side JavaScript. A scale from 1 to 100 may be used compute the value of the percentile. The client-side JavaScript component may take a snap shot of the current time (e.g., a timestamp) at millisecond level. The milliseconds portion may be used to compare with the percentile value and determine whether JARTA should be operative or not on the client. If it is determined that JARTA is not going to be operative, the client JavaScript component may set a "no action" cookie that indicates this fact. PSP may read the cookie and disable its work for the JARTA transaction for the particular client.

Additionally, the JavaScript portion maybe responsible for enabling/disabling the Java Applet loading into the browser. The Java Applet may be responsible for performing the following tasks: Record the end time (this maybe handled by JavaScript); Gather DNS look up time and status codes; Correlate and transform all the information into XML formatted data; and Transmit the data back to the web server via HTTP POST method.

In one embodiment, a unique ID maybe specified as a cookie to identify a browser session. This unique ID may include a time stamp and maybe encrypted by a random number. Additionally, the outcome may be run through a hash text algorithm. The cookie may be of the form: JARTA=aaabbbccc:"hash text". In case a browser session is determined by the random sampling algorithm as "no action", a cookie such as the following may be returned: JARTA="NoSoupForYou!"

It should be noted that the sampling described above is only one means of limiting the number of JARTA reports which the Site monitor must handle. Other mechanisms for achieving this function may also be implemented in various embodiments. For example, the site monitor may only accept a limited number of data reports per unit of time, so data that would otherwise overwhelm the processor is simply discarded. In another embodiment, load balancing of data reports between multiple management servers may be performed. In another embodiment, data reports could be filtered to restrict the amount of data reports from sources that are less likely to generate system errors. Still other mechanisms could be implemented in other embodiments.

JARTA editor. In one embodiment, a JARTA web page editor tool is provided to enhance JARTA user experience. It provides a user interface (UI) from which a web administrator can manage JARTA related web pages. In one embodiment, this tool is designed to help the web administrator to achieve the following goals. The UI should provide a way to easily navigate among web pages, allowing the user to select or tag various web pages (trees and tables). The tool places clients-side Java applet/JavaScript code inside web pages. The tool is capable of parsing through web pages for key token words such as "onSubmit" or "onClick" and insert JARTA references in appropriate places. It is suggested that the tool provide a confirmation window each time a JARTA reference or code is inserted. The tool should provide a way to roll back inserted JARTA data (i.e. one can roll back from version 2 to version 1 then back to the original web page.). The JARTA Editor may be a 100% Java based application, running under the Java 1.2 Virtual Machine. When this tool is run, the JARTA Editor loads in a configuration file. This configuration file will be a text file called Jarta.cfg which holds JARTA web site configuration information. A sample configuration file follows:

Activation Frequency of JARTA Pages
Activation_Frequency=5
DNS Lookup Time
DNS_Lookup_Time=false
Location Of Jarta enabling Code relative to web root
Jarta$_{13}$ Location=/JartaFiles FIGS. 12 through 15 illustrate exemplary dialog boxes for one embodiment of a JARTA editor tool. In one embodiment, the configuration file described above may be edited by a configuration dialog through a button/menu item on the main user interface screen (see FIG. 12 for an example dialog window screenshot). After loading in the configuration file, the JARTA editor may bring up the main user interface screen (see FIG. 14). Users may enter the full path of the root directory of the web server and click the load button. At this time, the JARTA editor traverses the entire directory structure, building a tree control which represents all the files under the web server. Users can navigate/browse all files using the tree control. JARTAable files will have checkboxes placed in front of the file name. JARTAized files will already have the checkbox checked. To JARTAize a file, users should check the checkbox next to the filename. At this time, a dialog box may pop up with JARTA page configuration parameters (see FIG. 13). Users enter in keywords for the page category, and enters in a short description of the page. Once the user clicks the OK button, the JARTA editor parses the selected file, inserting/replacing text. Depending on user preference, a confirmation box may appear each time the JARTA editor attempts to change the file (see FIG. 15). If changes are made, the JARTA editor may automatically create a backup file in a directory such as \oldJartaFiles and save the new file.

Synthetic Transaction Monitor (STM)

Figure 16:
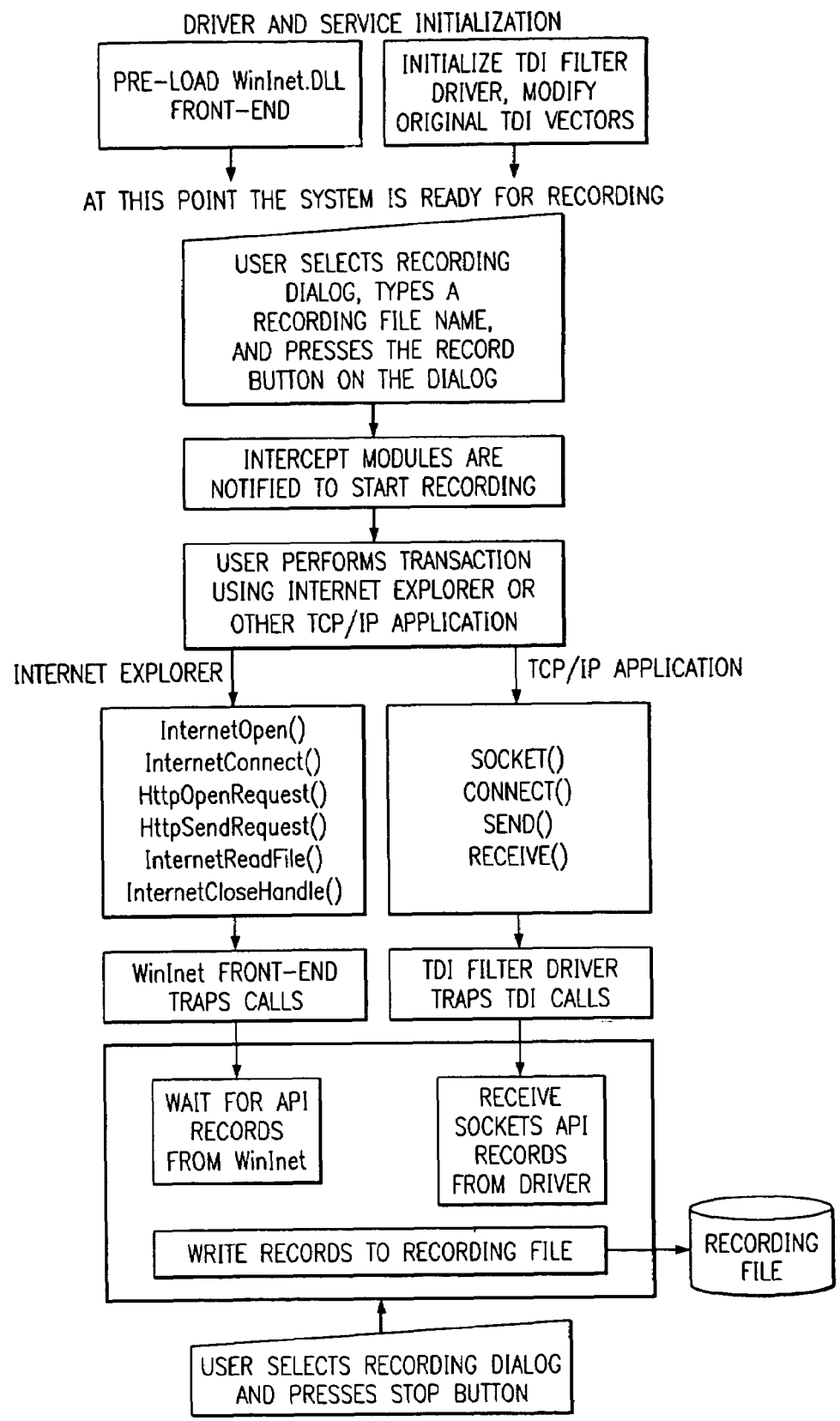
FIG. 16 is a flowchart illustrating a method of recording a synthetic transaction according to one embodiment.

RECORDING. Referring to FIG. 16, a low diagram illustrating the recording of information for later playback by a synthetic transaction monitor is shown. It should be noted that this diagram is actually a composite of two flow diagrams: one which applies to the recording of Windows Internet API calls; and one which applies to the recording of the TCP/IP stack. The steps in the center of the figure represents steps that are common to both methods. The steps which appear on the left side of the figure are applicable to the Windows API recording method (for Internet Explorer transactions), while the steps which appear on the right side of the figure are applicable to the TCP/IP method (for non-Internet Explorer transactions). Between these two methods, essentially any IP transaction can be recorded, although session management is provided only for HTTP and FTP sessions. The following description will center on the first method, which can easily be extended to cover the second method.

The first part of the method is preloading a modified WinInetDLL front-end. This library internally loads the original Windows library. Internet Explorer is therefore a forced to use the modified WinInet.DLL. This provides a hook into the driver. The new library includes references to the original library functions and an additional set of functions which are inserted into the driver to cause it to write the executed API calls out to a file.

When the modified driver is notified to do so, these functions will be activated and will begin to write the subsequent transaction to a file.

After the modified driver has been loaded, the user can open a recording dialog box and begin recording a transaction. When the user chooses to begin recording, the intercept modules in WinInet.DLL are notified and the recording process begins. This involves a device I/O call to the driver and/or some communication via common mapped file storage to the WinInet.DLL front-end to enable the front-end functions to pass all requests back to the recording interface. The user then performs one or more transactions using Internet Explorer or some other TCP/IP application. A series of Internet API calls are shown on the left of the figure, while a series of TCP/IP calls are shown on the right side of the figure.

If, after starting the recording, the user opens Internet Explorer, the first thing he would do is type in a URL of a web page he wants to see. This would cause Internet Explorer to issue a set of API calls. The calls shown in the box on the left side of the figure correspond to a typical Web request. A Web transaction would consist of multiple sets of these calls because a web page consists of multiple objects that have to be pulled from the Web server. Since Internet Explorer is multithreaded, there will be multiple threads concurrently fetching objects and the corresponding requests will typically be interleaved with each other.

As the Internet calls are made, the modified WinInet front-end traps the calls and sends them to a thread and that is waiting to receive the corresponding API records. These records are then written to a recording file (shown at the bottom right of the figure). The trapping and recording of the API records continues until the user stops the recording (e.g., by pushing the stop button in the recording dialog box As noted above, the same process is followed with non-Internet Explorer transactions by following the boxes on the right side of the figure, rather than the let.

PLAYBACK. Referring to FIGS. 17*a*-17*d*, a low diagram illustrating the playback of a recorded transaction is shown. To playback a set of recorded transactions, the transactions (the "playback object") our first initialized from the corresponding file header. Then, the recording file is pre-scanned to identify server side connections that must be made before the transactions are played back. The server side connections should be set up in preparation for any FTP transactions because an FTP session sets up both the client side connection and the server side connection. An API record is then read from the recording file.

If the API record is not a WinInet API record, it is assumed to be either a connect request, a send request, a receive request or a disconnect request. If it is none of these, an undefined-record-type error message is generated. If it is one of these types of requests, it is processed accordingly. In other words, a connect request causes a connection to the recorded IP address, a send request causes location of a connection and sending of recorded data, a receive request causes the accounting of bytes received and a disconnect request causes dated to be read, match percentage computed and the connection disconnected.

Figure 17A:
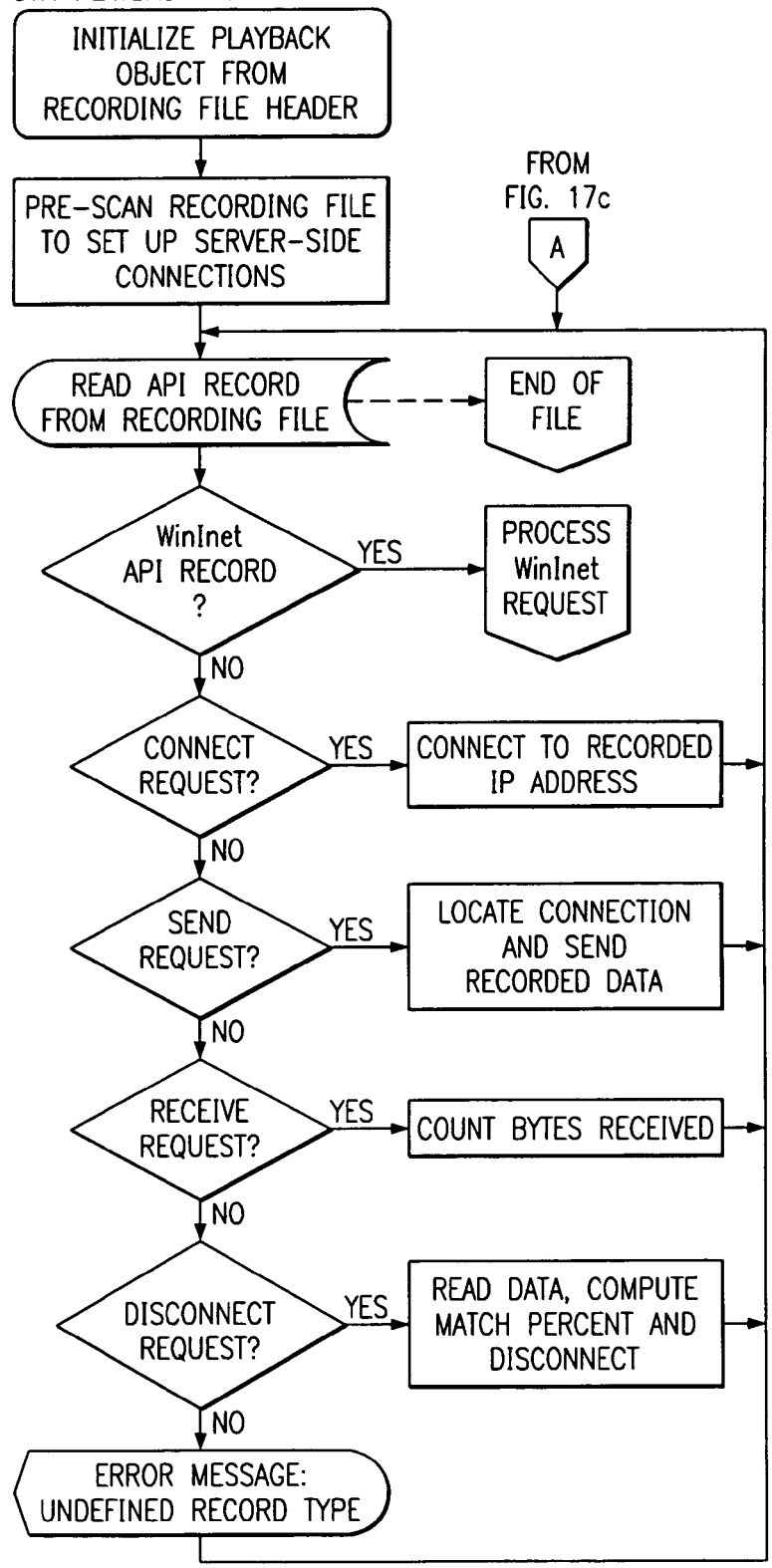
FIGS. 17*a*-17*d* are flowcharts illustrating a method of playing back a synthetic transaction according to one embodiment.
Figure 17C:
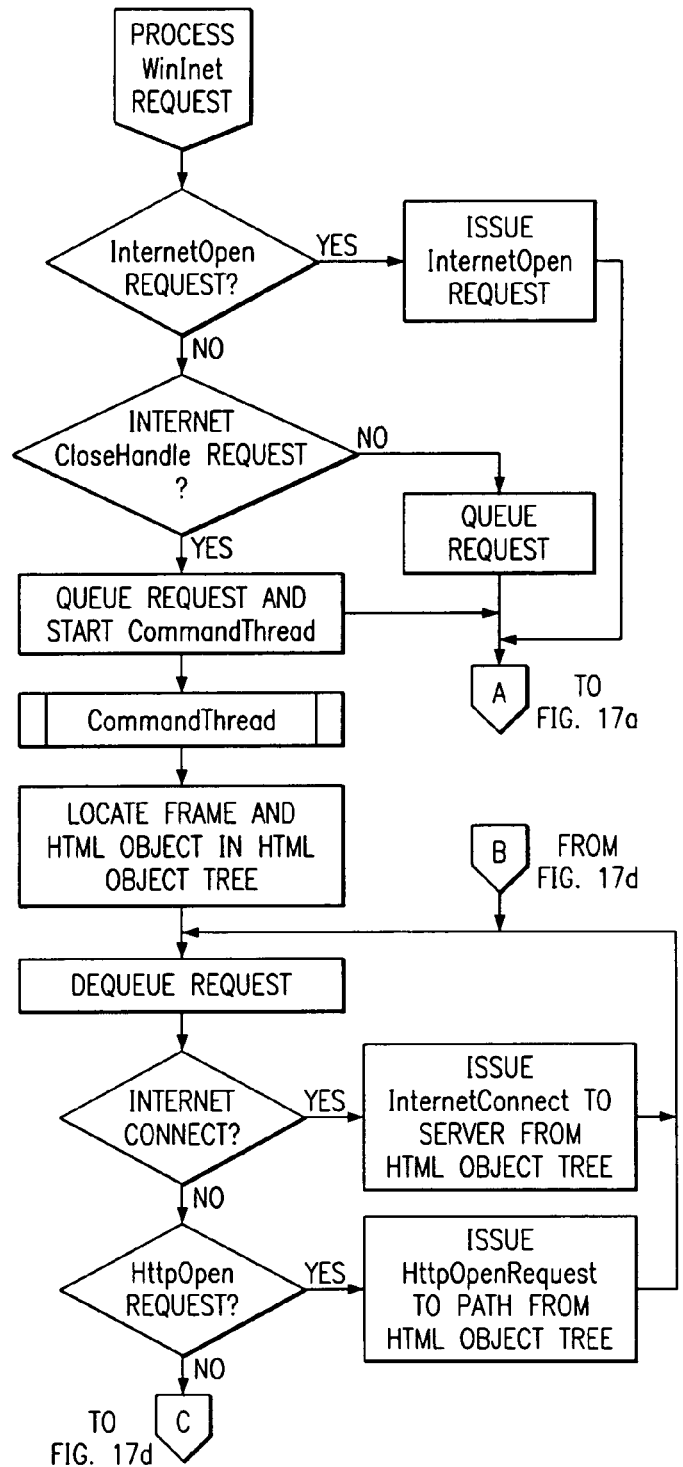

If the API record is a WinInet API record, it is processed as shown at the top of FIG. 17*c*. If the record is an InternetOpen request, the InternetOpen request is issued. All other records for each Internet connection are added in time sequence to a queue for that connection. If the record is an Internet CloseHandle request for a connection, the request is queued and a command thread is started to reissue the API requests for that connection. Thus, when a request is closed, a corresponding command thread is launched. This is effectively de-interleaves the requests. After the record is processed or queued, the next API record is read from the recording file.

Referring to the command thread process starting at the middle of FIG. 17*c*, the frame and HTML object are first located in the HTML object tree. It should be noted that the first request in the recording is issued without any context management—it is a static request. The HTML object tree is built upon this request. After the frame and HTML object are located, a request is pulled from the queue (i.e., it is dequeued). This request is then examined to determine whether it is an Internet connect, HttpOpen, HttpSend, InternetRead or InternetClose handle request. If it is none of these, an undefined-type error message is generated and the next request is pulled from the queue. If it is one of these types of requests, it is handled accordingly. In other words, an Internet connect causes an Internet connect to be issued to the server from the HTML object tree, and HTTPOpen causes an HTTPOpen request to be issued to a path from the HTML object tree, and an HTTPSend causes an HTTPSend request to be issued with data from the HTML object tree. An Internet read causes originally received HTML data to be decompressed and processed and the originally received bytes to be counted. If the request is an Internet close handle, an Internet read file is issued for all data, HTML data is decompressed and processed and an HTML object tree is created, a match percentage is computed and connection statistics are aggregated, and an Internet close handle request is issued. Finally, objects are cleaned up and control is returned.

Figure 17B:
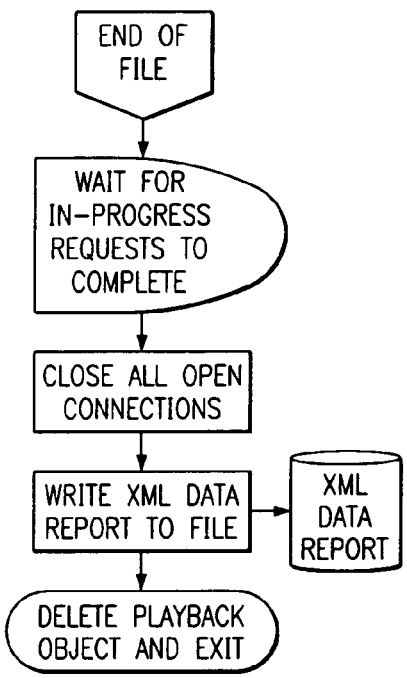
Figure 17D:
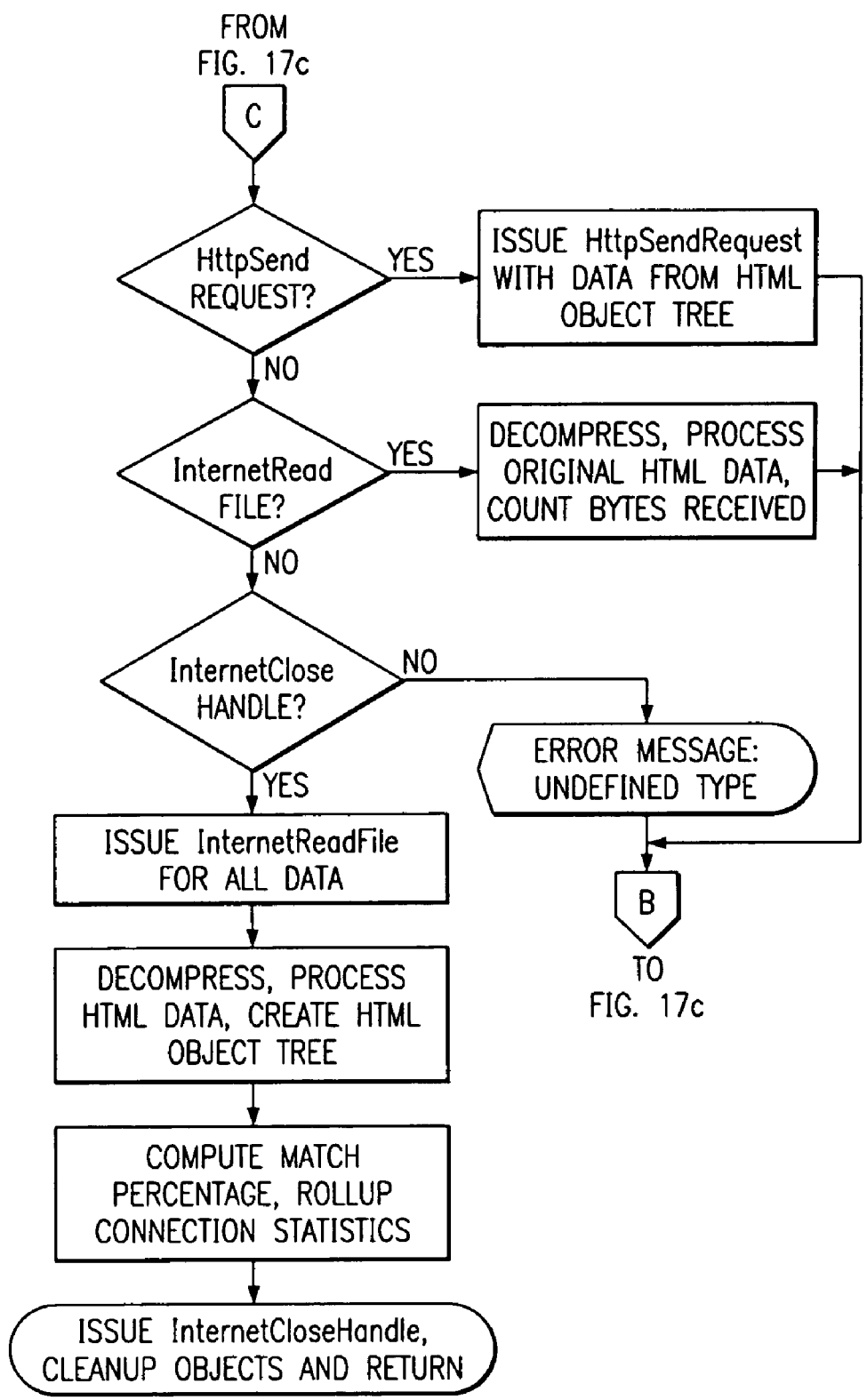

When the end of file has been reached and no unread API records are left in the recording file, the end-of-file process illustrated in the lower half of FIG. 17*b* is followed. This consists of waiting for all in-progress requests to complete, closing all open connections, writing an XML data report to a file and exiting.

It should be noted that when an Internet connect or HttpOpen request is issued, it is not necessarily the originally recorded server or path. Instead, it maybe the server located in the HTML object tree created upon playback. (As noted above, the first request in the recording file is a static request and will identify the originally recorded server.) Similarly, an HttpSend request will be issued with the data from the HTML object tree corresponding to the originally recorded data. Internet read requests proceed normally, handling the HTML data and building the object tree.

A match percentage is computed in response to an Internet close handle request by comparing the HTML source received during playback to the originally recorded HTML source. Since the requested web pages may have changed between the time of recording and the time of playback, the HTML source code may differ. After the match percentage has been computed and connection statistics have been reported, the corresponding set of API requests is done and the corresponding web page (Internet object) has been processed. Subsequent passes through this process can use the new HTML object tree to locate a frame and HTML object data.

It should be noted that locating objects within the HTML object tree created upon playback may not be straightforward because the objects within the tree may have changed. It may therefore be necessary to select the nearest approximation of the object identified in the recording file. This approximation may be determined based upon the server name and path.

Several distinctive features of the STM include:

1) the method of recording Windows TDI layer calls and translating to sockets API calls during playback.

2) the method of intercepting WinInet API calls 3) the generalized method of recording API calls as applied to the WinInet API 4) the optimized method of comparing binary data and determining percentage differences 5) the method of determining the browser path selected based on recorded WinInet API calls 1) Transport Driver Interface (TDI) Recording Process. STM performs a mapping between recorded TDI requests and the corresponding Winsock requests which are made during playback (of a "non-web" transaction recorded in the TDI program). The TDI requests are captured by a Windows filter driver which intercepts the TCP/IP driver's IRP requests and passes certain request data to a service program which writes the data to a "recording file".

This mapping is as follows:

| Irp->MinorFunction | Winsock function |
|---|---|
| TDI_CONNECT | connect |
| TDI_SEND | send |
| TDI_RECEIVE | recv |
| TDI_DISCONNECT | shutdown, closesocket |

2) WinInet Recording Process. Recording HTTP sessions through the TDI recording process is not useful when the HTTP session is encrypted with the Secure Sockets Layer algorithm, primarily because the encryption key expires within about one minute. Therefore, to make a useful recording of an HTTP session, it is necessary to capture the data before it is encrypted. One way of doing this with Internet Explorer is to capture the Internet API calls, since the Internet API is a documented interface that Internet Explorer uses for all HTTP (and other) communications.

WinInet.dll is loaded by Internet Explorer and the entry points are obtained by using the Win32 GetProcAddress function. In order to record Internet API requests, Internet Explorer must be given the address of the recording intercept functions in place of the real Internet API functions. If a library has already been loaded in a Windows process, the next LoadLibrary function call for the same library will simply return the address of the already loaded library and increment a use count. Therefore, STM attempts to get control in the Internet Explorer process before it has loaded WinInet.dll, and load the recording intercept library (also called WinInet.dll) first. The recording intercept library loads the real WinInet.dll and saves its entry points. Each time an intercept function is called by Internet Explorer, the real API function is called, then the parameters and return code are written to a recording file. The parameter list is marshaled as described below.

3) Generalized API Recording Process. In order to record any application Program Interface call, it is necessary to capture all the parameters that are passed into the call. The data that is returned by the call is also useful for comparison. The data can be expressed as the following general data types:

buffer pointer—pointer to a buffer with a defined variable length double word—a fixed 4-byte value structure pointer—pointer to a structure that can be expressed as another parameter list each parameter is represented in one of these forms as it is written to the recording fie.

As an example, the InternetOpenA request is written in this form:

EXAMPLE 1

Function: InternetOpenA
5 Parameters plus return code
Double Word return code (handle)
Buffer Pointer, length is number of characters in agent name, plus one character NULL terminator
Double Word access type
Buffer Pointer, length is number of characters in proxy name, plus one character NULL terminator
Buffer Pointer, length is number of characters in proxy bypass list, plus one character NULL terminator
Double Word containing flags
WININET Function: InternetOpenA
  Number parms: 5
    Length: 123
    Flags: Onlyin chain
  0 . . . Parm Type: HANDLE
  0 . . . Value: 0x00cc0004
  0 . . . Data Length: 0
  1 Parm Type: BUFFER POINTER
  1 . . . Value: 0x00770ac0
  1 . . . Data Length: 51
Mozilla/4.0 (compatible; MSIE 5.5; Windows NT 4.0)
  2 . . . Parm Type: DWORD
  2 . . . Value: 0
  2 . . . Data Length: 0
  3 . . . Parm Type: BUFFER POINTER
  3 . . . Value: 0x00000000
  3 . . . Data Length 0
  4 . . . Parm Type: BUFFER POINTER
  4 . . . Value: 0x00000000
  4 . . . Data Length: 0
  5 . . . Parm Type: DWORD
  5 . . . Value: 268435456
  5 . . . Data Length: 0

4) Match Percentage Algorithm. Comparison functions are not currently available to allow STM to compare data it receives during playback to the original data received when the recording was made. This comparison is useful in determining if the transaction is "tracking" correctly (faithfully reproducing the original transaction), and whether any dramatic changes have occurred on the monitored server. The matching algorithms below were developed to meet this objective.

In order to determine a percentage difference, it is necessary to determine where inserts and deletes occurred, since a byte-by-byte comparison could yield a zero percent match if one byte were inserted at the beginning of either buffer. However, recursive loops required to accurately determine inserts and repeats can be extremely CPU intensive on large buffers, negating the benefit of monitoring response time by biasing the measurement with time that was not in the originally recorded transaction. Therefore it is also necessary to make a trade-off between performance and accuracy. STM does this in a way that is remarkably reliable and low-overhead, because it is optimized to examine HTML pages by default.

The process is essentially as follows:

Compare byte-by-byte between new buffer and old buffer until a mismatch is found.

First, assuming a string of characters has been replaced, search up to 1024 bytes looking for the next corresponding set of 12 consecutive bytes that match. This point would be the limit (Limit A) of the following searches.

Up to Limit A or the end of the buffer, whichever comes first, search for a set of 12 consecutive bytes that match by incrementing the new buffer pointer. This point would be "re-synch candidate 1". Repeat this search by incrementing the old buffer pointer. This would be "re-synch candidate 2".

Whichever re-synch candidate is closest to the origin now becomes Limit A. Repeat step 3) by incrementing both new and old buffer pointers up to 512 times.

If a re-synch point was determined in prior steps, count bytes inserted or deleted and continue at step 1). Otherwise, count remaining bytes as mismatched and terminate.

5) WinInet Playback Process. Re-issuing the recorded Internet API calls is simply a matter of "un-marshalling" the recorded parameters and calling the Internet API. Unfortunately, some session management must be done because monitored web sites change frequently, and many times requests contain session variables that change each time a transaction is executed. At the time that STM was written, most web sites maintained session variables by embedding them in hidden HTML elements, such as <INPUT Type="Hidden"> fields, or <A> (anchor) elements that contain an HTTP reference with variables pre-formed in the URL string. Therefore, during playback STM can build a virtual web page from the HTML source received, and can issue requests from one page to the next by creating requests from the selected HTML elements like Internet Explorer does.

However, it is not trivial to determine from the recorded Internet API requests which HTML element was selected by the browser, and STM must determine which element to generate the request from in order to make the correct request. The way STM does this is described below.

The first request is issued with exactly the same URL as the original recording. Therefore, a playback must begin with a "static" URL request.

After the page is received during playback, build two HTML "object trees", one from the originally recorded HTML source, and one from the newly received HTML source.

On subsequent requests in the recording file, determine which object was selected by searching the previously built HTML object tree to find the object that would have generated this request. If no object was found, the request must be issued exactly as it was when recorded.

If the original request object was found in step 3), locate the corresponding object in the "new" object tree which was built from the HTML source received during playback. The corresponding object has the same position in the new object tree as the object located in the original object tree.

If the path of the object in the new object tree is different from the path in the original object tree, the object may have changed position on the page. In this case, the playback program must attempt to locate the closest object where the paths are the same. First search the new object tree for the same type of object (input, form, anchor, etc.) from this point forward. If not found, search from this point backward. If neither search finds an object of the same type with the same path, assume that the object position is unchanged and the path itself has changed.

Generate the request from the object in the new object tree.

Because Internet Explorer is multi-threaded and STM playback must emulate the response time characteristics of the browser, STM playback is also multi-threaded. This greatly complicates the process of maintaining an HTML object tree. Access to the trees must be synchronized, and the tree state must be maintained in time contest of the requests that are being issued. Therefore, many times the requests that are being read from the recording file cannot be issued until prior requests are complete and the object tree has been updated. When a request from an anchor or form element is read, for example, the request cannot be issued until all prior requests in the recording tie have been processed.

Site Monitor Connector/Gatherer

In one embodiment, data communication from the various sources to the site monitor collector is done using XML over HTTP POST method. Here is a typical example of a JARTA report sent from the JARTA applet:

<?xml version="1.0"?>
<JARTA UID="aaaabbbbcccc">
<Data Name="SessionStartupTime">9353423454</Data>
<Data Name="PageURL">//www.bmc.com/ebusiness</Data>
<Data Name="PageTime">102345</Data>
<Data Name="TransactionTime">133</Data>
<Data Name="DNSLookupTime">15</Data>
<Data Name="DNSLookupStatusCode">200</Data>
<Data Name="Keywords">/Auctions</Data>
<Data Name="Description">Book purchase</Data>
</JARTA>

PSP packages its data in the following fashion:

<?xml version="1.0"?>
<JARTA UID="aaaabbbbcccc">
<Data Name="PageURL">//www.bmc.com/ebusiness/default.htm</Data>
<Data Name="WSLatencyTime">54</Data>
<Data Name="WSProcessTime">15</Data>
</JARTA>

A PSP enhancement 210 may measure web server latency and/or perform proxy tasks. In various embodiments, a server-side plug-in analyzer and proxy (e.g., SafePassage extension 210) may provide one or more of the following functions:

determining and reporting server-side information,
receiving and transmitting XML data reports from outlying JARTA instances to another server for further processing (PSP Proxy),
detecting a JARTA or STM transaction which needs to server-side tracking (via cookies),
tracking a JARTA or STM transaction or request,
relating a JARTA or STM transaction to a unique browser and browser session,
calculating elapsed server-processing time,
calculating server latency time,
calculating transaction authentication time,
determining transaction completion status code,
associating client IP address to unique session identifier and browser identifier,
storing collected statistics locally during collection,
formulating XML data report representing collected information, transmitting server-side tracked information to another server (site monitor) for further processing, identifying and reporting transmission failures of server-side information, and identifying and reporting data overrun conditions.

This list of methods is not intended to be exclusive and is intended to provide examples of the functionality that may be supported by the server-side plug-in analyzer and proxy.

A site monitor collector 220 may collect data and communicate the data to a site Monitor data processor 224. In one embodiment, the site monitor collector 220 is a centralized collecting device which collects data not only from JARTA 302, but also from STM 204 and ISM 212 components. A site monitor data processor 224 may process the output from the site monitor collector 220 by correlating, filtering and reformatting data into usable information for the site monitor KM 226. The site monitor KM 226 may integrate the information into the PATROL 428 management domain for monitoring and management of the managed server(s) (e.g., managed web server 208).

In one embodiment, the PSP extension 210 may be operable to collect the following information: web server latency (time required for web server to process request); web server processing time (total time required for the web server to process request and send reply); and request processing status.

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM as well as signals such as electrical, electromagnetic, or digital signals, conveyed via a communication medium such as a network and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:

transmitting a first page from a server to a client in an enterprise computing environment, wherein the first page comprises web page content and a first software application configured to monitor one or more performance parameters associated with the enterprise computing environment and with respect to processing performed in conjunction with the first page, store user settings of a browser on the client including one or more user settings corresponding to a browser IP address, a browser locale, a browser language session, a browser session identifier, or a user selected category keyword in a cookie jar of the browser on the client, perform one or more computations on the monitored performance parameters, aggregate the results of the one or more computations and the user settings and transmit the aggregated data results and user settings to the server when a second page is accessed wherein the aggregated results and user settings are transmitted in conjunction with a request for the second page; and transmitting the second page from a server to the client, wherein the second page comprises a second software application, wherein the second software application is configured to determine if portions of the second software application are to be executed by searching for a flag associated with the second software application in the cookie jar of the browser, wherein determining if portions of the second software application are to be activated comprises sampling a timestamp, converting a portion of the sampled timestamp to a percentage of a time period, and executing the portions of the first software application only if the percentage is within a predetermined range.

2. The method of claim 1, wherein the first software application is configured to store the one or more performance parameters in the cookie jar of the browser.

3. The method of claim 1, wherein the first software application is configured to determine if portions of the first software application are to be activated.

4. The method of claim 3, wherein the first software application is configured to deactivate portions of the first software application and place a flag associated with the first software application in the cookie jar if portions of the first software application are not to be activated.

5. The method of claim 4, wherein the flag associated with the second software application indicates that portions of the second software application are not to be activated.

6. The method of claim 4, wherein the first software application is configured to activate portions of the first software application and place the flag associated with the first software application in the cookie jar if portions of the first software application are not to be activated.

7. The method of claim 6, wherein the flag associated with the second software application indicates that portions of the second software application are to be activated.

8. The method of claim 1, wherein the first software application is configured to search for the flag associated with the first software application in the cookie jar indicating if portions of the first software application are to be activated.

9. The method of claim 3, wherein determining if portions of the first software application are to be activated comprises sampling a timestamp, converting a millisecond portion of the sampled timestamp to a percentage of a full second, and executing the portions of the first software application only if the percentage is within a predetermined range.

10. A method comprising: receiving a first page from a server in an enterprise computing environment, wherein the first page comprises web page content and a first software application configured to monitor one or more performance parameters associated with the enterprise computing environment and with respect to processing performed in conjunction with the first page, store user settings of a browser on the client including one or more user settings corresponding to a browser ID address, a browser locale, a browser language session, a browser session identifier, or a user selected category keyword in a cookie jar of the browser on the client, perform one or more computations on the monitored performance parameters, aggregate the results of the one or more computations and the user settings and transmit the aggregated results and user settings to the server when a second page is accessed wherein the aggregated results and user settings are transmitted in conjunction with a request for the second page; and receiving the second page from the server, wherein the second page comprises a second software application, wherein the second software application is configured to determine if portions of the second software application are to be executed by searching for a flag associated with the second software application in the cookie jar of the browser, wherein determining if portions of the second software application and to be activated comprises sampling a timestamp, converting a portion of the sampled timestamp to a percentage of a time period, and executing the portions of the first software application only if the percentage is within a predetermined range.

11. The method of claim 10, wherein the first software application is configured to store the one or more performance parameters in the cookie jar of the browser.

12. The method of claim 10, wherein the first software application is configured to determine if portions of the first software application are to be activated.

13. The method of claim 12, wherein the first software application is configured to deactivate portions of the first software application and place a flag associated with the first software application in the cookie jar if portions of the first software application are not to be activated.

14. The method of claim 12, wherein the flag associated with the second software application indicates that portions of the second software application are not to be activated.

15. The method of claim 12, wherein the first software application is configured to activate portions of the first software application and place the flag associated with the first software application in the cookie jar if portions of the first software application are not to be activated.

16. The method of claim 15, wherein the flag associated with the second software application indicates that portions of the second software application are to be activated.

17. The method of claim 12, wherein the first software application is configured to search for the flag associated with the first software application in the cookie jar indicating if portions of the first software application are to be activated.

18. The method of claim 10, wherein determining if portions of the first software application are to be activated comprises sampling a timestamp, converting a millisecond portion of the sampled timestamp to a percentage of a full second, and executing the portions of the first software application only if the percentage is within a predetermined range.

19. A method comprising: transmitting a first page from a server to a client in an enterprise computing environment, wherein the first page comprises web page content and a first software application; receiving an aggregation of results of one or more computations and one or more user settings of a browser on the client including one or more user settings corresponding to a browser IP address, a browser locale, a browser language session, a browser session identifier, or a user selected category keyword and the results of a computation on one or more performance parameters associated with the enterprise computing environment and with respect to processing performed in conjunction with the first page, wherein the aggregation of results of one or more computations and one or more user settings are received in conjunction with a request for a second page and transmitting & the second page from the server to the client, wherein the second page comprises a second software application, wherein the second software application is configured to determine if portions of the second software application are to be executed by searching for a flag associated with the second software application in a cookie jar of the browser, wherein determining if portions of the second software application are to be activated comprises sampling a timestamp converting a portion of the sampled timestamp to a percentage of a time period, and executing the portions of the first software application only if the percentage is within a predetermined range.

20. The method of claim 19 further comprising intercepting a web request from the client.

21. The method of claim 19 further comprising establishing criteria to determine whether portions of the second software application are to be executed.

22. The method of claim 19 further comprising sampling a set of the aggregations of the user settings and the results of the computations on the one or more performance parameters.

23. The method of claim 19 further comprising discarding some of a set of the aggregations of the user settings and the results of the computations on the one or more performance parameters.

24. The method of claim 19 further comprising establishing an alarm threshold associated with the one or more performance parameters.

25. A system comprising: a server; an editor on the server and further including a set of software instructions stored on a computer readable storage medium and executable by a computer processor to: display a plurality of web pages, allow a user to select a first web page from the plurality of web pages, and based on the selection, insert a software application in the first web page; and a client operable to request the first web page wherein the software application is configured to: determine if portions of the software application are to be executed by searching for a flag associated with the second software application in a cookie jar of the browser, wherein determining if portions of the second software application are to be activated comprises sampling a timestamp, Converting a portion of the sampled timestamp to a percentage of a time period, and executing the portions of the first software application only if the percentage is within a predetermined range monitor one or more performance parameters associated with the enterprise computing environment and with respect to processing performed in conjunction with the first web page, store settings associated with a browser on the client including one or more settings corresponding to a browser IP address, a browser locale, a browser language, a browser session identifier, or a category keyword in a cookie jar of the browser on the client, perform one or more computations on the monitored performance parameters, aggregate the results of the one or more computations and the browser settings and transmit the aggregated data to the server when a second web page is accessed wherein the results are transmitted in conjunction with a request for the second web page.

* * * * *